United States Patent
Kikuchi et al.

(10) Patent No.: US 9,906,777 B2
(45) Date of Patent: Feb. 27, 2018

(54) STEREOSCOPIC DISPLAY DEVICE

(71) Applicant: Sharp Kabushiki Kaisha, Osaka-shi, Osaka (JP)

(72) Inventors: Ryoh Kikuchi, Osaka (JP); Takehiro Murao, Osaka (JP); Takuto Yoshino, Osaka (JP); Hiroshi Fukushima, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 1 day.

(21) Appl. No.: 15/030,925

(22) PCT Filed: Aug. 26, 2014

(86) PCT No.: PCT/JP2014/072299
§ 371 (c)(1),
(2) Date: Apr. 21, 2016

(87) PCT Pub. No.: WO2015/060002
PCT Pub. Date: Apr. 30, 2015

(65) Prior Publication Data
US 2016/0261857 A1 Sep. 8, 2016

(30) Foreign Application Priority Data

Oct. 24, 2013 (JP) .................................. 2013-221599

(51) Int. Cl.
*H04N 13/31* (2018.01)
*H04N 13/04* (2006.01)
(Continued)

(52) U.S. Cl.
CPC ..... *H04N 13/0409* (2013.01); *G02B 27/2214* (2013.01); *G02F 1/1323* (2013.01);
(Continued)

(58) Field of Classification Search
CPC .. H04N 13/0409; H04N 13/0477; G02F 1/31; G02F 1/133784; G02F 1/1323; G02F 1/134363
(Continued)

(56) References Cited

U.S. PATENT DOCUMENTS

2012/0320171 A1* 12/2012 Lee ..................... G02B 27/2214
348/54
2013/0342586 A1* 12/2013 Kim ...................... G02F 1/1313
345/690
(Continued)

FOREIGN PATENT DOCUMENTS

JP    2013-24957 A    2/2013

*Primary Examiner* — Christopher Raabe
(74) *Attorney, Agent, or Firm* — Keating & Bennett, LLP

(57) ABSTRACT

A stereoscopic display device (1) of the present invention includes a display panel (10), a switch liquid crystal panel (20), a first polarizing plate (15) and a second polarizing plate (24), and a control unit for moving a parallax barrier in which transmitting regions and non-transmitting regions are formed in periodic fashion in a predetermined alignment direction, in such a manner that the parallax barrier is moved in the predetermined alignment direction in accordance with position information, and causing the switch liquid crystal panel (20) to display the parallax barrier. A first alignment film (216) and a second alignment film (226) of the switch liquid crystal panel (20) are rubbed so that molecule long axes of liquid crystal molecules in the vicinities of the center of a liquid crystal layer (23) in the thickness direction in a state where no voltage is applied are oriented in a direction perpendicular to the alignment direction as viewed in a plan view. Retardation of the liquid crystal layer (23) is in a range of 380 nm to 466 nm both inclusive when an intersection angle that is an angle formed between a rubbing direction of the first alignment film (216) and a transmission axis of the first polarizing plate (15) is in a range of 0° exclusive to 18°

(Continued)

inclusive, and is in a range of 410 nm to 450 nm both inclusive when the intersection angle is in a range of 18° exclusive to 45° inclusive.

8 Claims, 21 Drawing Sheets

(51) Int. Cl.
    *G02B 27/22*      (2018.01)
    *G02F 1/13*      (2006.01)
    *G02F 1/1337*      (2006.01)
    *G02F 1/1343*      (2006.01)
    *G02F 1/31*      (2006.01)

(52) U.S. Cl.
    CPC .. *G02F 1/133784* (2013.01); *G02F 1/134309* (2013.01); *G02F 1/134363* (2013.01); *G02F 1/31* (2013.01); *H04N 13/0477* (2013.01); *H04N 13/0497* (2013.01)

(58) Field of Classification Search
    USPC .......................................................... 349/15
    See application file for complete search history.

(56) References Cited

U.S. PATENT DOCUMENTS

| | | | | |
|---|---|---|---|---|
| 2014/0063207 A1* | 3/2014 | Li | ................ | H04N 13/0404 |
| | | | | 348/51 |
| 2014/0168548 A1* | 6/2014 | Murao | ............ | H04N 13/0409 |
| | | | | 349/15 |
| 2015/0054860 A1* | 2/2015 | Lin | ................ | G09G 3/3607 |
| | | | | 345/690 |
| 2015/0277130 A1* | 10/2015 | Yoshino | ............ | G02B 27/2214 |
| | | | | 348/51 |

* cited by examiner

|  |  | Axis angle |
|---|---|---|
| Switch liquid crystal panel 20<br>Retardation: 419nm, 450nm | Polarizing plate 24 | 0° |
|  | Alignment film 226 | 135° |
|  | Alignment film 216 | 45° |
| Display device 10<br>4.7-inch full high definition, IPS | Polarizing plate 15 | 90° |
|  | Polarizing plate 14 | 0° |
FIG. 11
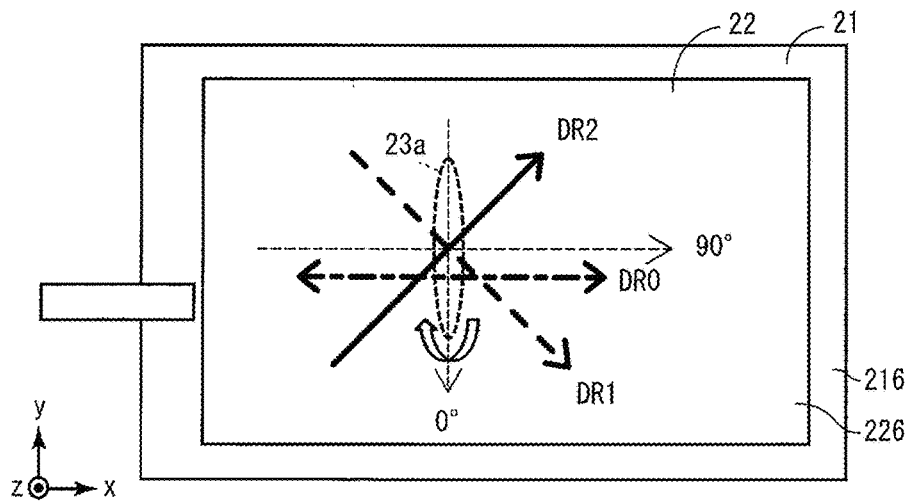
FIG. 12
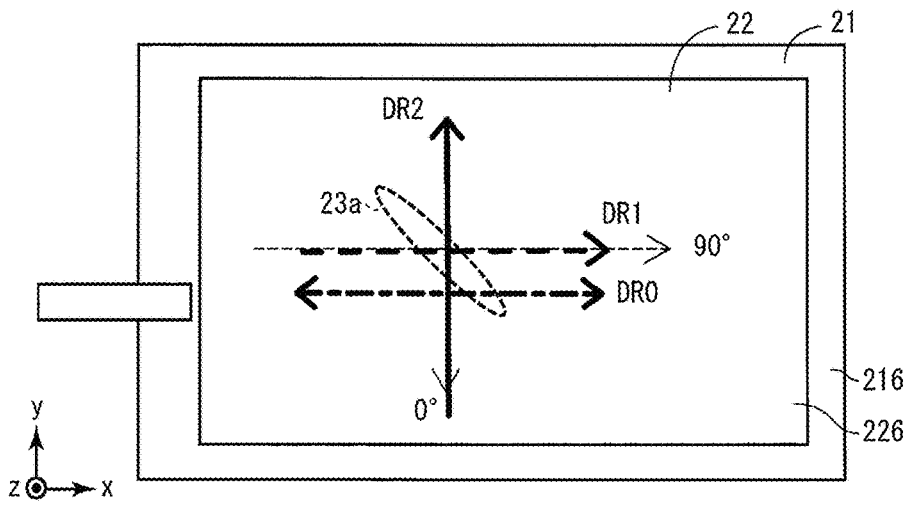
FIG. 13

|  | Transmittance | Chromaticity shift ($\Delta x, \Delta y$) |
|---|---|---|
| Retardation: 237nm | 26 (▲74%) | (▲0.082,▲0.095) Shift to blue |
| Retardation: 351nm | 74 (▲26%) | (▲0.053,▲0.043) Shift to blue |
| Retardation 419nm (Configuration example 1−1) | 93 (▲7%) | (▲0.023,+0.002) Shift to blue |
| Retardation: 450nm (Configuration example 1−2) | 97 (▲3%) | (▲0.001,+0.031) Shift to yellow |
| Retardation: 514nm | 92 (▲8%) | (+0.059,+0.095) Shift to yellow |
| Comparative example | 100 | (0.3024,0.3417) |

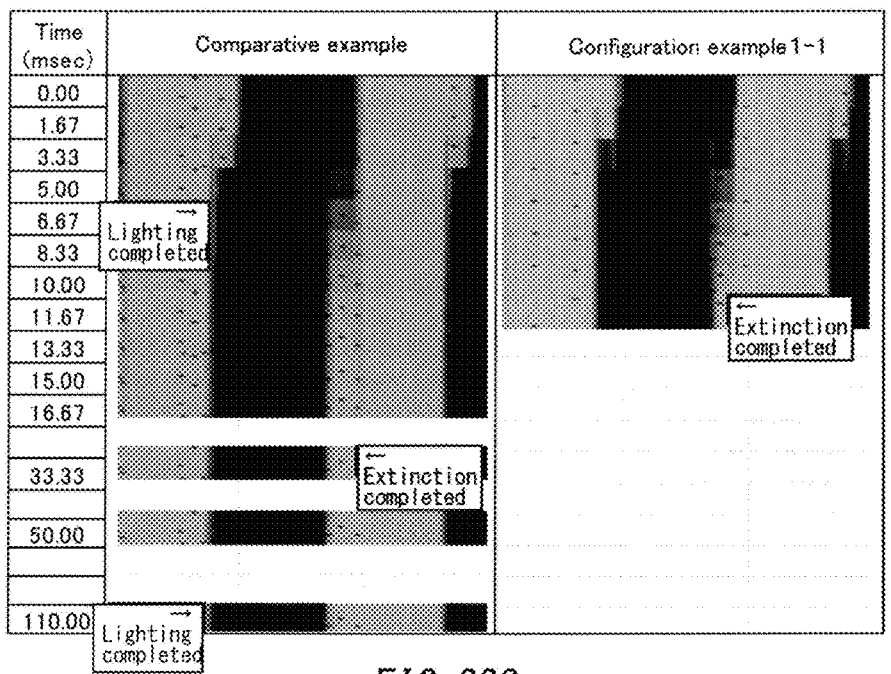
FIG. 22C
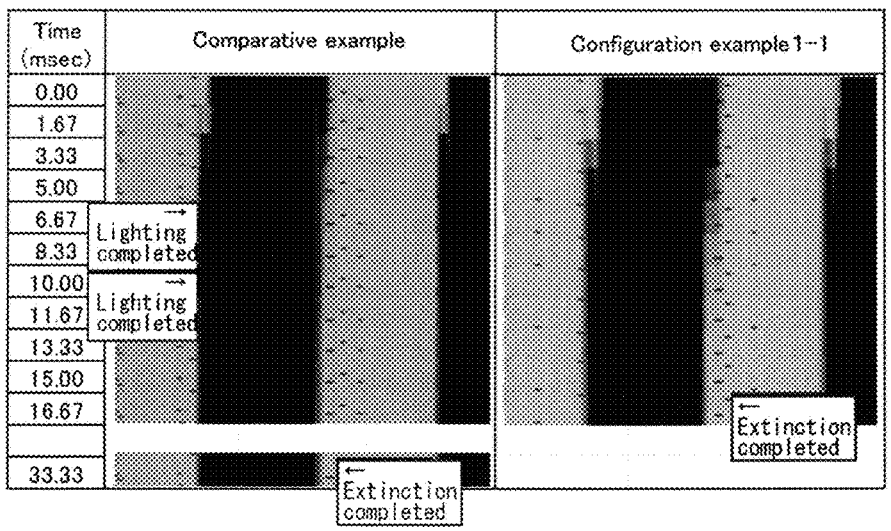
FIG. 22D
| Response time | Comparative example | Configuration example 1-1 |
|---|---|---|
| Right→Left | ≦23msec | ≦23msec |
| Left→Right | ≦77msec | ≦7msec |
| Right-left difference | 54msec | 16msec |
FIG. 23

|  |  | Axis angle |
|---|---|---|
| Switch liquid crystal panel20<br>Retardation: 435nm, 466nm | Polarizing plate24 | 153° |
|  | Alignment film226 | 135° |
|  | Alignment film216 | 45° |
| Display device10<br>4.7-inch full high definition, VA | Polarizing plate15 | 63° |
|  | Polarizing plate14 | 153° |
FIG. 24
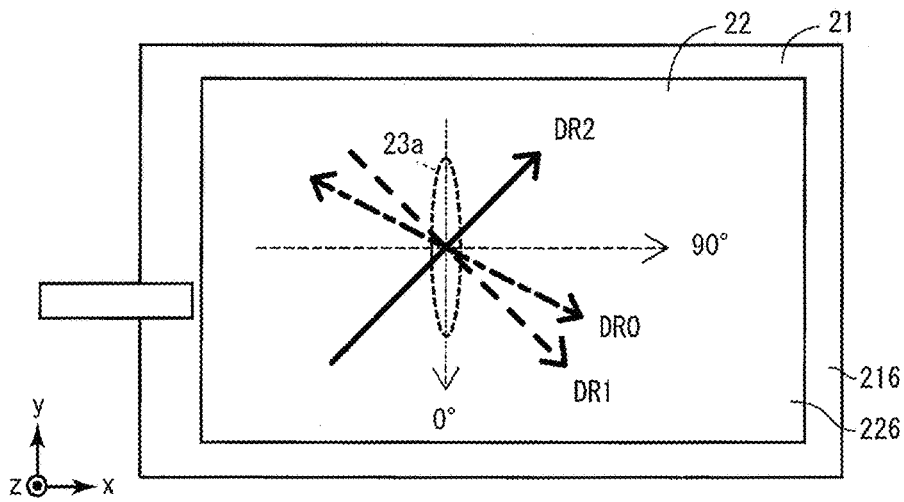
FIG. 25
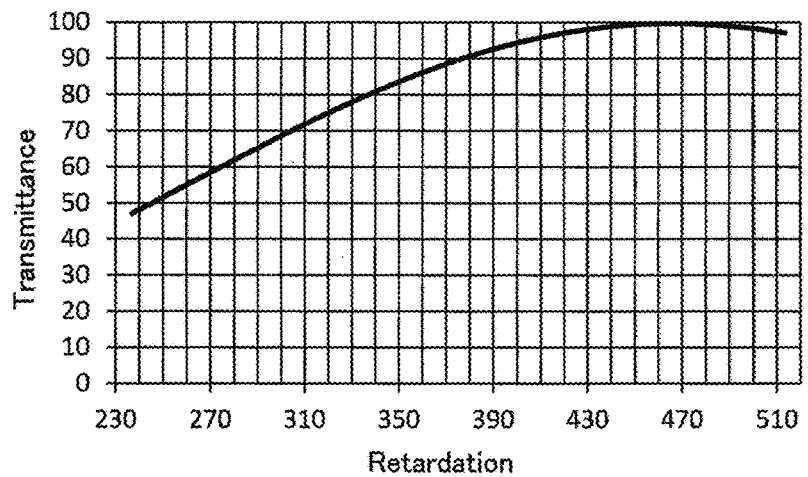
FIG. 26

| | Transmittance | Chromaticity shift (Δx, Δy) |
|---|---|---|
| Retardation: 237nm | 47 (▲53%) | (▲0.052, ▲0.056) Shift to blue |
| Retardation: 351nm | 85 (▲15%) | (▲0.033, ▲0.027) Shift to blue |
| Retardation 435nm (Configuration example2-1) | 98 (▲2%) | (▲0.011, +0.001) Shift to blue |
| Retardation: 466nm (Configuration example2-2) | 100 (▲0%) | (▲0.000, +0.013) Shift to yellow |
| Retardation: 514nm | 92 (▲8%) | (+0.059, +0.095) Shift to yellow |
| Comparative example | 100 | (0.3024, 0.3417) |

STEREOSCOPIC DISPLAY DEVICE

TECHNICAL FIELD

The present invention relates to a naked-eye stereoscopic display device.

BACKGROUND ART

As a stereoscopic display device that can be viewed with naked eyes, those of a parallax barrier type and a lenticular lens type are known. The stereoscopic display devices of these types separate light using barriers or lenses, and cause different images to be visible to the right and left eyes, respectively, so as to cause the viewer to have a stereoscopic vision. Further, a technique of a switch liquid crystal display (SW-LCD) of a barrier division type has been proposed, wherein a parallax barrier is formed with a liquid crystal panel and is moved according to the position of a viewer.

JP2013-24957A discloses a display device that includes: a display panel on which pairs of subpixels are arrayed in a lateral direction; and a parallax barrier shutter panel on which sub-openings whose light transmitting state and light blocking state can be switchable are arrayed in the lateral direction. In this display device, among a plurality of sub-openings corresponding to a reference parallax barrier pitch, an arbitrary number of adjacent sub-openings are turned to be in the light transmitting state, and the other sub-openings are turned to be in the light blocking state, whereby integrated openings obtained are formed in the parallax barrier shutter panel. Then, the sub-opening pitch is equal to or smaller than the difference between the width of the subpixel and the width of the integrated opening.

DISCLOSURE OF THE INVENTION

With this type of SW-LCD, which moves the parallax barrier according to a viewer position, a viewer can view stereoscopic images from any position in a wide range. In the case of the SW-LCD, therefore, viewing angle properties which mean a display image quality when the stereoscopic display device is viewed diagonally, which do not matter in a case where the parallax barrier is fixed, become important.

It is an object of the present invention to obtain a configuration of a stereoscopic display device having excellent viewing angle properties.

A stereoscopic display device disclosed herein includes: a display panel for displaying an image; a switch liquid crystal panel arranged on the display panel; a first polarizing plate and a second polarizing plate arranged so as to be opposed to each other with the switch liquid crystal panel being interposed therebetween; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, and causing the switch liquid crystal panel to display the parallax barrier. The switch liquid crystal panel includes: a liquid crystal layer; a first substrate and a second substrate that are opposed to each other with the liquid crystal layer being interposed therebetween; a first alignment film formed on the first substrate; and a second alignment film formed on the second substrate. The first alignment film and the second alignment film are rubbed so that molecule long axes of liquid crystal molecules in the vicinities of the center of the liquid crystal layer in the thickness direction in a state where no voltage is applied are oriented in a direction perpendicular to the alignment direction as viewed in a plan view. An intersection angle is in a range of 0° exclusive to 45° inclusive, the intersection angle being an angle formed between a rubbing direction of the alignment film on the liquid crystal panel side among the first alignment film and the second alignment film, and a transmission axis of the polarizing plate on the switch liquid crystal panel side among the first polarizing plate and the second polarizing plate. Retardation of the liquid crystal layer is in a range of 380 nm to 466 nm both inclusive when the intersection angle is in a range of 0° exclusive to 18° inclusive, and is in a range of 410 nm to 450 nm both inclusive when the intersection angle is in a range of 18° exclusive to 45° inclusive.

The present invention makes it possible to obtain a configuration of a stereoscopic display device with excellent viewing angle properties.

BRIEF DESCRIPTION OF DRAWINGS

FIG. 11 illustrates one example of settings of a display panel and a switch liquid crystal panel of a stereoscopic display device.

FIG. 12 is a plan view schematically illustrating a transmission axis DR0 of a polarizing plate, a rubbing direction DR1 of one of alignment films, and a rubbing direction DR2 of the other alignment film, in one configuration example of a stereoscopic display device according to Embodiment 1.

FIG. 13 is a plan view schematically illustrating a transmission axis DR0 of a polarizing plate, a rubbing direction DR1 of one of alignment films, and a rubbing direction DR2 of the other alignment film, in a stereoscopic display device according to a comparative example.

FIG. 22C illustrates temporal variation of a barrier lighting state when a barrier is moved from right to left.

FIG. 22D illustrates temporal variation of a barrier lighting state when a barrier is moved from right to left.

FIG. 23 is a table in which response times of switch liquid crystal panels 20 of stereoscopic display devices according to a configuration example and a comparative example are compiled.

FIG. 24 is a table illustrating another example of settings of a display panel and a switch liquid crystal panel of a stereoscopic display device.

FIG. 25 is a plan view schematically illustrating a transmission axis RO of a polarizing plate, a rubbing direction DR1 of one of alignment films, and a rubbing direction DR2 of the other alignment film, in another configuration example of a stereoscopic display device according to Embodiment 1.

FIG. 26 is a graph illustrating the relationship between retardation of a liquid crystal layer and transmittance of a switch liquid crystal panel.

MODE FOR CARRYING OUT THE INVENTION

Figure 1:
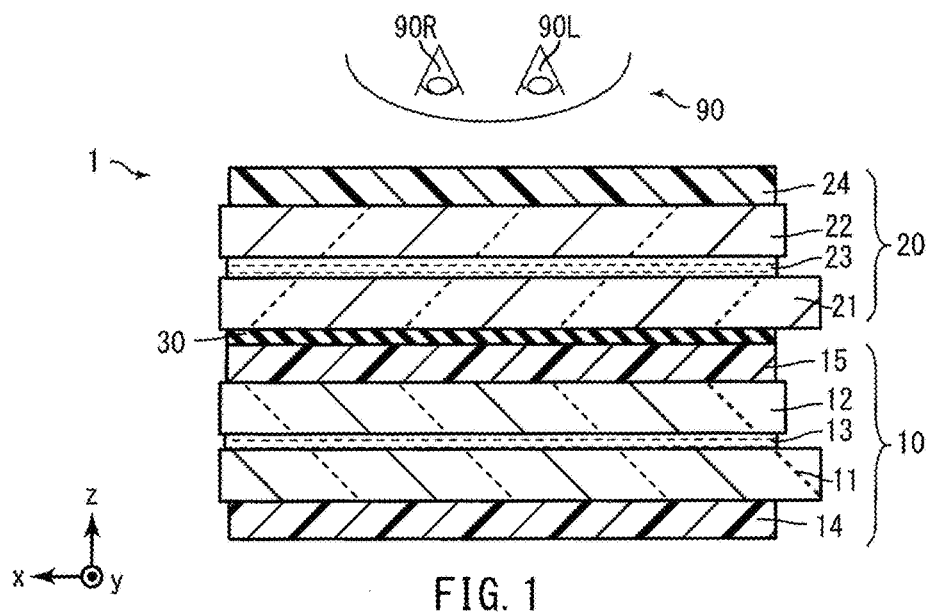
FIG. 1 is a schematic cross-sectional view illustrating a configuration of a stereoscopic display device according to Embodiment 1 of the present invention.

A stereoscopic display device according to an embodiment of the present invention includes: a display panel for displaying an image; a switch liquid crystal panel arranged on the display panel; a first polarizing plate and a second polarizing plate arranged so as to be opposed to each other with the switch liquid crystal panel being interposed therebetween; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, and causing the switch liquid crystal panel to display the parallax barrier. The switch liquid crystal panel includes: a liquid crystal layer; a first substrate and a second substrate that are opposed to each other with the liquid crystal layer being interposed therebetween; a first alignment film formed on the first substrate; and a second alignment film formed on the second substrate. The first alignment film and the second alignment film are rubbed so that molecule long axes of liquid crystal molecules in the vicinities of the center of the liquid crystal layer in the thickness direction in a state where no voltage is applied are oriented in a direction perpendicular to the alignment direction as viewed in a plan view. An intersection angle is in a range of 0° exclusive to 45° inclusive, the intersection angle being an angle formed between a rubbing direction of the alignment film on the liquid crystal panel side among the first alignment film and the second alignment film, and a transmission axis of the polarizing plate on the switch liquid crystal panel side among the first polarizing plate and the second polarizing plate. Retardation of the liquid crystal layer is in a range of 380 nm to 466 nm both inclusive when the intersection angle is in a range of 0° exclusive to 18° inclusive, and is in a range of 410 nm to 450 nm both inclusive when the intersection angle is in a range of 18° exclusive to 45° inclusive (the first configuration).

According to the above-described configuration, a parallax barrier in which transmitting regions and non-transmitting regions are formed in periodic fashion in a predetermined alignment direction is displayed on the switch liquid crystal panel. With this, when a viewer views the stereoscopic display device at an appropriate position, a part of an image on the display panel is visible to the right eye, and the other part of the image is visible to the left eye. This allows the viewer to have a stereoscopic vision. The control unit moves the parallax barrier in the alignment direction in accordance with the position information of the viewer acquired by the position sensor, and causes the switch liquid crystal panel to display the parallax barrier. This makes it possible to maintain crosstalk at a low level.

According to the above-described configuration, the first alignment film and the second alignment film of the switch liquid crystal panel are rubbed so that the direction (referred to as a "viewing angle direction) of molecule long axes of liquid crystal molecules at the center of the liquid crystal layer in the thickness direction in a state where no voltage is applied are oriented in a direction perpendicular to the alignment direction of the parallax barrier as viewed in a plan view. This makes it possible to make the viewing angle properties of the liquid crystal display device symmetric with respect to the alignment direction of the parallax barrier. Besides, regarding a case where the parallax barrier is moved to one side in the alignment direction, and a case where the same is moved to the other side, the difference in the response time of liquid crystal between these cases can be reduced.

As the intersection angle, which is an angle formed between the rubbing direction of the alignment film and the transmission axis of the polarizing plate, is greater, the viewing angle properties degrade more. The intersection angle is therefore preferably small. The direction of the transmission axis of the polarizing plate, however, cannot be changed depending on the method for driving the display panel or the like in some cases. If the alignment film is rubbed along the transmission axis of the polarizing plate, therefore, the viewing angle direction cannot be made perpendicular to the alignment direction of the parallax barrier, in some cases.

According to the above-described configuration, when the retardation of the liquid crystal layer is set to 380 nm to 466 nm when the intersection angle is in a range of 0° exclusive to 18° inclusive, and is set to 410 nm to 450 nm when the intersection angle is in a range of 18° exclusive to 45° inclusive. This prevents the viewing angle properties from degrading.

In the first configuration, preferably, an angle formed between a transmission axis of the first polarizing plate and a transmission axis of the second alignment film is 90°, and an angle formed between a rubbing direction of the first alignment film and a rubbing direction of the second alignment film is 90° (the second configuration).

In the first or second configuration, the intersection angle may be 45° (the third configuration).

In the first or second configuration, the intersection angle may be 18° (the fourth configuration).

In any one of the first to fourth configurations, the switch liquid crystal panel may be arranged on the viewer side with respect to the display panel (the fifth configuration).

In any one of the first to fifth configurations, preferably, the switch liquid crystal panel further includes: a first electrode group that includes a plurality of electrodes that are arranged in the alignment direction at a predetermined interval on the first substrate; and a second electrode group that includes a plurality of electrodes that are arranged in the alignment direction at a predetermined interval on the second substrate, wherein the first electrode group and the second electrode group are arranged so as to be deviated with respect to each other by half of the predetermined interval in the alignment direction (the sixth configuration).

According to the above-described configuration, the minimum unit used in the movement of the parallax barrier can be reduced to half of the interval at which electrodes of the first electrode group and the second electrode group are formed. This allows the parallax barrier position to be switched more finely, thereby suppressing luminance variation and degradation regarding crosstalk.

In any one of the first to sixth configurations, the display panel may be an in-plane switching (IPS) liquid crystal display panel (the seventh configuration).

In any one of the first to sixth configurations, the display panel may be a vertical alignment (VA) liquid crystal display panel (the eighth configuration).

Embodiment

The following describes embodiments of the present invention in detail, while referring to the drawings. In the drawings, identical or equivalent parts in the drawings are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

Overall Configuration

FIG. 1 is a schematic cross-sectional view illustrating a configuration of a stereoscopic display device 1 according to Embodiment 1 of the present invention. The stereoscopic display device 1 includes a display panel 10, a switch liquid crystal panel 20, and an adhesive resin 30. The display panel 10 and the switch liquid crystal panel 20 are arranged so as to be stacked in such a manner that the switch liquid crystal panel 20 is positioned on the viewer 90 side, and are stuck with each other with the adhesive resin 30.

The display panel 10 includes a TFT (thin film transistor) substrate 11, a CF (color filter) substrate 12, a liquid crystal layer 13, and polarizing plates 14 and 15. The display panel 10 controls TFT substrate 11 and the CF substrate 12 so as to operate the alignment of liquid crystal molecules in the liquid crystal layer 13, thereby to display images.

The switch liquid crystal panel 20 includes a first substrate 21, a second substrate 22, a liquid crystal layer 23, and a polarizing plate 24. The first substrate 21 and the second substrate 22 are arranged so as to be opposed to each other. The liquid crystal layer 23 is interposed between the first substrate 21 and the second substrate 22. The polarizing plate 24 is arranged on the viewer 90 side.

Though FIG. 1 does not illustrate detailed configuration, electrodes are formed on the first substrate 21 and the second substrate 22. The switch liquid crystal panel 20 controls potentials of these electrodes so as to operate the alignment of liquid crystal molecules of the liquid crystal layer 23, thereby to change behavior of light passing through the liquid crystal layer 23. More specifically, the switch liquid crystal panel 23 forms non-transmitting regions (barriers) that block light, and transmitting regions (slits) that transmit light, by using the alignment of the liquid crystal molecules of the liquid crystal layer 23 and the operations of the polarizing plate 15 and the polarizing plate 24. The configurations and operations of the first substrate 21 and the second substrate 22 are to be described in detail below.

The TFT substrate 11 and the CF substrate 12 have a thickness of, for example, 200 μm. The polarizing plates 14 and 15 have a thickness of, for example, 130 μm each. The first and second substrates 21 and 22 have a thickness of, for example, 350 μm each. The thickness of the adhesive resin 30 is, for example, 50 μm.

The polarizing plate 15 may be arranged on the switch liquid crystal panel 20. More specifically, the configuration may be such that the polarizing plate 15 is arranged on a surface on the display panel 10 side of the first substrate 21 of the switch liquid crystal panel 20, and the adhesive resin 30 is arranged between the polarizing plate 15 and the CF substrate 12.

Hereinafter, a direction parallel to a line extending between the left eye 90L and the right eye 90R of the viewer 90 when the viewer 90 and the stereoscopic display device 1 face each other directly (the x direction in FIG. 1) is referred to as a "horizontal direction". Further, the direction orthogonal to the horizontal direction in the surface of the display panel 10 (the y direction in FIG. 1) is referred to as a "vertical direction".

Figure 2:
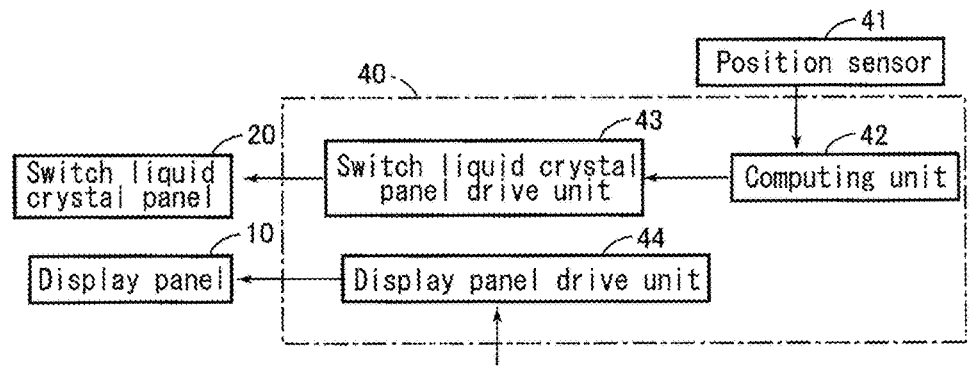
FIG. 2 is a block diagram illustrating a functional configuration of the stereoscopic display device according to Embodiment 1 of the present invention.
Figure 3:
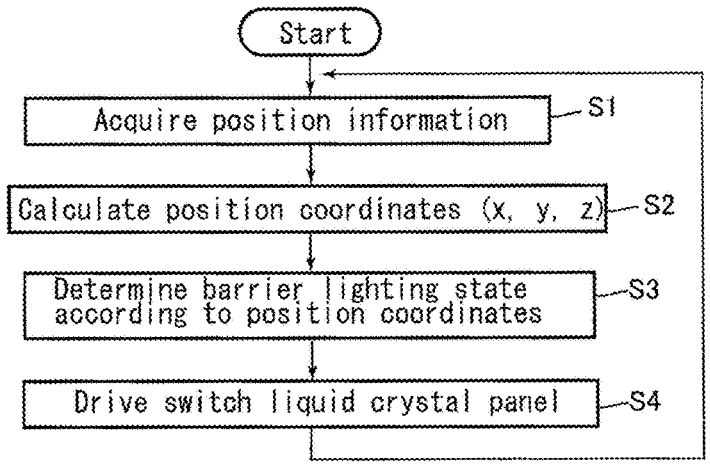
FIG. 3 is a flowchart of a processing by the stereoscopic display device according to Embodiment 1 of the present invention.

FIG. 2 is a block diagram illustrating a functional configuration of the stereoscopic display device 1. FIG. 3 is a flowchart illustrating a processing operation by the stereoscopic display device 1. The stereoscopic display device 1 further includes a control unit 40 and a position sensor 41. The control unit 40 includes a computing unit 42, a switch liquid crystal panel drive unit 43, and a display panel drive unit 44.

The display panel drive unit 44 drives the display panel 10 based on a video signal that is input from outside, and causes the display panel 10 to display an image.

The position sensor 41 acquires position information regarding the position of the viewer 90 (Step S1). The position sensor 41 is, for example, a camera or an infrared light sensor. The position sensor 41 supplies the acquired position information to the computing unit 42 of the control unit 40.

The computing unit 42 analyzes the position information of the viewer 90 supplied from the position sensor 41, and calculates position coordinates (x, y, z) of the viewer 90 (Step S2). The calculation of the position coordinates can be performed by, for example, an eye tracking system for detecting the position of the eyes of the viewer 90 by image processing. Alternatively, the calculation of the position coordinates may be performed by a head tracking system for detecting the position of the head of the viewer 90 with infrared light.

The computing unit 42 further determines a barrier lighting state of the switch liquid crystal panel 20 according to the position coordinates of the viewer 90 (Step S3). More specifically, according to the position coordinates of the viewer 90, the positions of the barriers and the positions of the slits of the switch liquid crystal panel 20 are determined. The computing unit 42 supplies the determined information of the barrier lighting state to the switch liquid crystal panel drive unit 43.

The switch liquid crystal panel drive unit 43 drives the switch liquid crystal panel 20 based on the information supplied from the computing unit 42 (Step S4). Thereafter, Steps S1 to S4 are repeated.

Next, the following description explains principles of the stereoscopic display by the stereoscopic display device 1, using FIGS. 4A to 4C and FIGS. 5A to 5C.

Figure 4A:
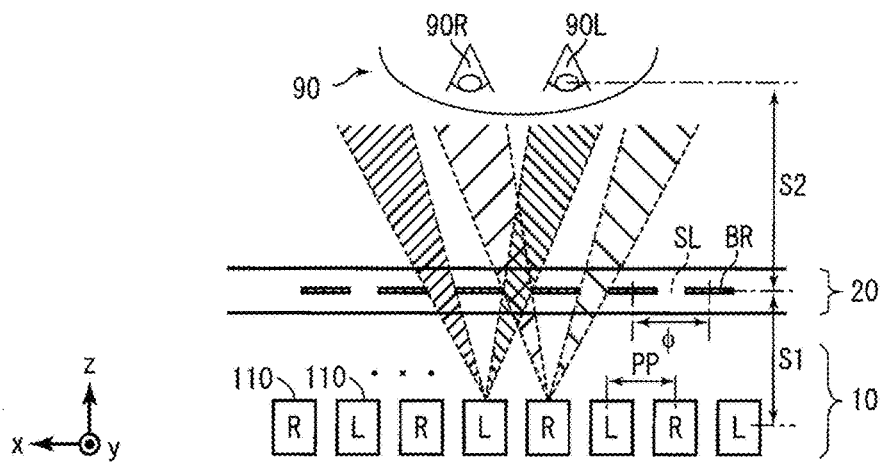
FIG. 4A is a view for explaining principles of the stereoscopic display by the stereoscopic display device according to Embodiment 1 of the present invention.
Figure 4B:
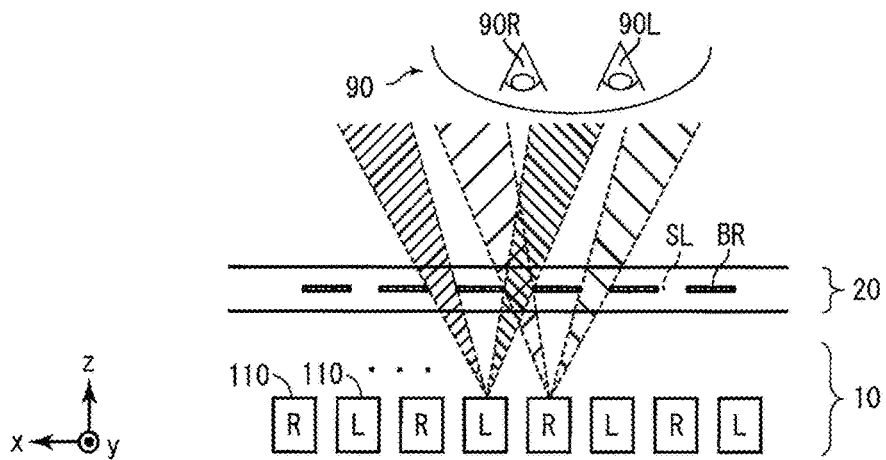
FIG. 4B is a view for explaining principles of the stereoscopic display by the stereoscopic display device according to Embodiment 1 of the present invention.
Figure 4C:
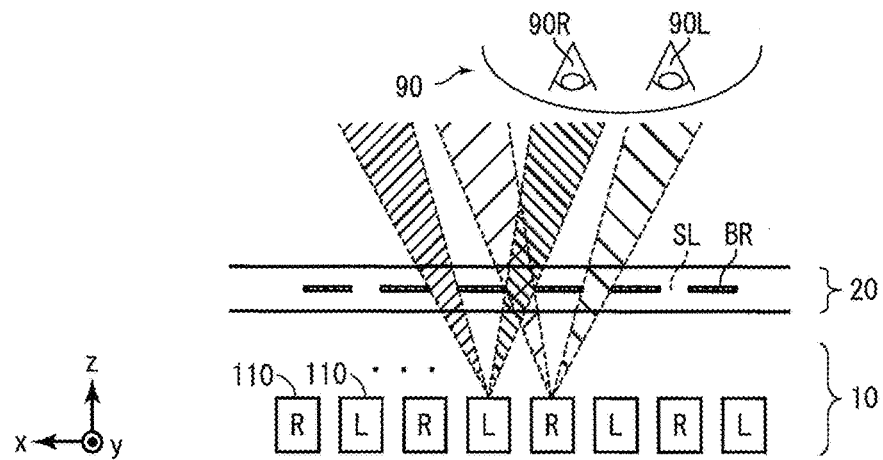
FIG. 4C is a view for explaining principles of the stereoscopic display by the stereoscopic display device according to Embodiment 1 of the present invention.

First of all, a case is explained where the barrier lighting state is fixed, with reference to FIGS. 4A to 4C. The display panel 10 includes a plurality of pixels 110. On the pixels 110, a right-eye image (R) and a left-eye image (L) are alternately displayed in the horizontal direction. In the switch liquid crystal panel 20, barriers BR that block light and slits SL that transmit light are formed at predetermined intervals. This allows only the right-eye image (R) to be visible to the right eye 90R of the viewer 90, and allows only the left-eye image (L) to be visible to the left eye 90L, as illustrated in FIG. 4A. This allows the viewer 90 to have a stereoscopic vision.

The interval PP of the pixels 110 and the interval φ of the barriers BR satisfy the following expression when S2 is sufficiently greater than S1:

$$\phi \approx 2 \times PP$$

where S1 is a distance from the display surface of the display panel 10 to the barriers BR, and S2 is a distance from the barriers BR to the viewer 90.

FIG. 4B illustrates a state in which the viewer 90 has moved from the position shown in FIG. 4A in the horizontal direction. In this case, to the right eye 90R of the viewer 90, both of the right-eye image (R) and the left-eye image (L) are visible. Similarly, to the left eye 90L, both of the right-eye image (R) and the left-eye image (L) are visible. In other words, crosstalk is occurring, and the viewer 90 cannot have a stereoscopic vision.

FIG. 4C illustrates a state in which the viewer 90 has further moved from the position shown in FIG. 4B in the horizontal direction. In this case, to the right eye 90R of the viewer 90, the left-eye image (L) is visible, and to the left eye 90L thereof, the right-eye image (R) is visible. In this case, the state of pseudoscopic vision occurs wherein a video image that should be recognized as being positioned behind is observed in the foreground, and in contrast, a video image that should be recognized as being positioned in the foreground is observed behind, which makes the viewer 90 unable to have an appropriate stereoscopic vision, and give uncomfortable feeling to him/her.

In this way, as the viewer 90 moves, a normal area where a stereoscopic vision can be obtained, a crosstalk area where crosstalk occurs, and a pseudoscopic area where the state of pseudoscopic vision occurs, appear repeatedly. Therefore, in the case where the barrier lighting state is fixed, the viewer 90 can have a stereoscopic vision only in limited areas.

Figure 5A:
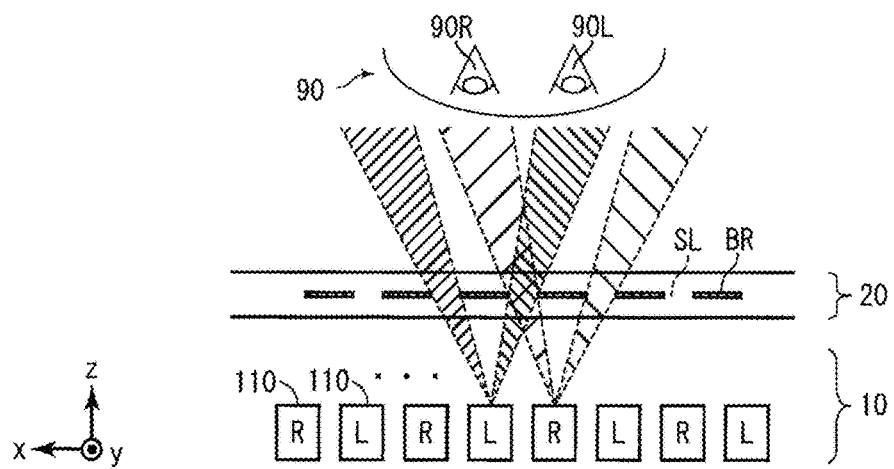
FIG. 5A is a view for explaining principles of the stereoscopic display by the stereoscopic display device according to Embodiment 1 of the present invention.
Figure 5B:
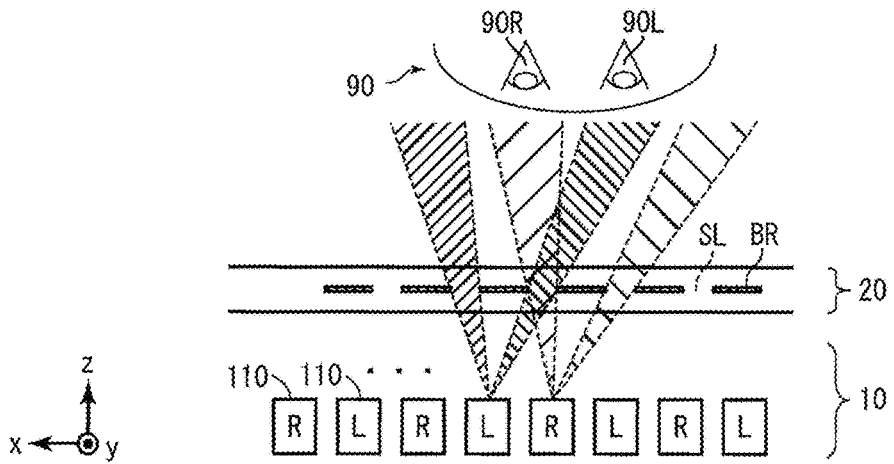
FIG. 5B is a view for explaining principles of the stereoscopic display by the stereoscopic display device according to Embodiment 1 of the present invention.
Figure 5C:
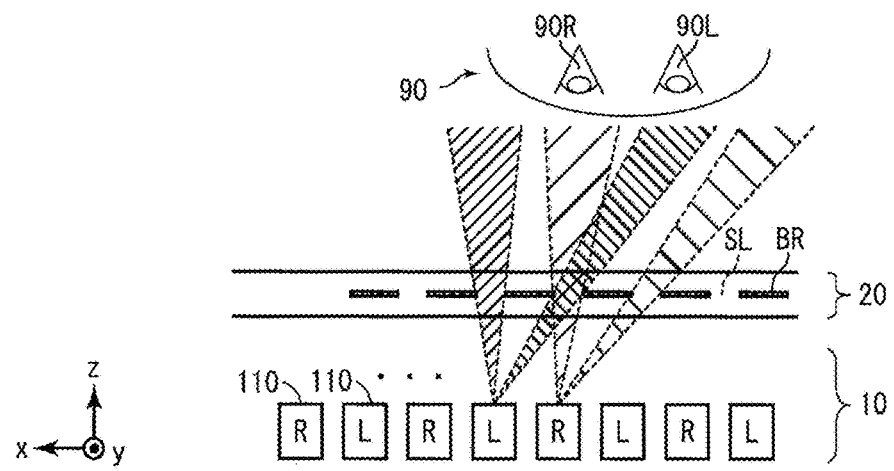
FIG. 5C is a view for explaining principles of the stereoscopic display by the stereoscopic display device according to Embodiment 1 of the present invention.

In the present embodiment, the control unit 40 changes the barrier lighting state of the switch liquid crystal panel 20 according to the position information (position coordinates) of the viewer 90, as illustrated in FIGS. 5A to 5C. This allows the viewer 90 to have a stereoscopic vision always, and prevents crosstalk and the state of pseudoscopic vision from occurring.

[Configuration of Switch Liquid Crystal Panel 20]

Figure 6A:
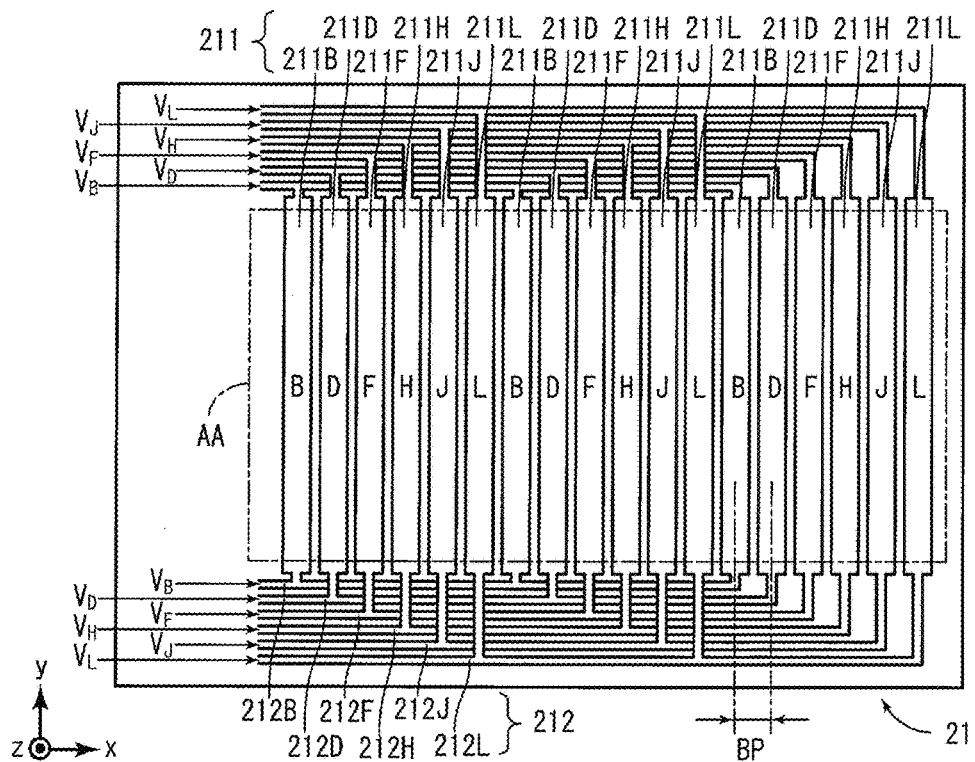
FIG. 6A is a plan view illustrating a configuration of a first substrate of a switch liquid crystal panel.

FIG. 6A is a plan view illustrating a configuration of the first substrate 21 of the switch liquid crystal panel 20. On the first substrate 21, a first electrode group 211 is formed. The first electrode group 211 includes a plurality of electrodes arranged in the x direction at electrode intervals BP. Each of the electrodes extends in the y direction, and they are arranged in parallel with one another.

On the first substrate 21, there is further formed a line group 212 that is electrically connected with the first electrode group 211. The line group 212 is preferably formed outside a region that overlaps a display region of the display panel 10 (an active area AA) when the switch liquid crystal panel 20 is stacked on the display panel 10.

Figure 6B:
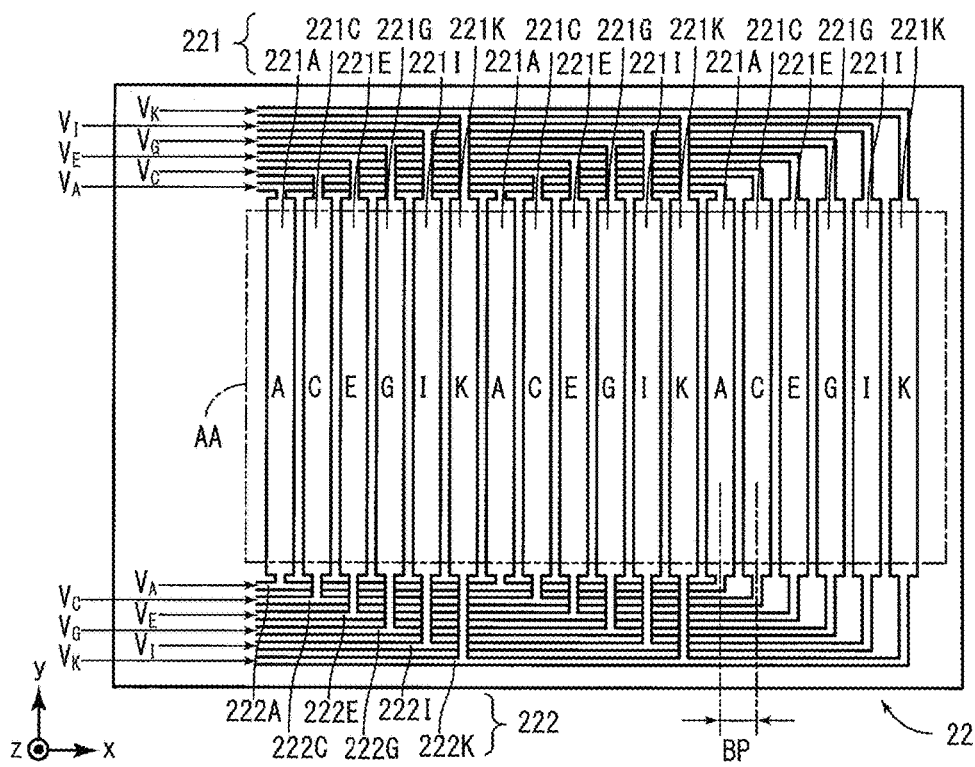
FIG. 6B is a plan view illustrating a configuration of a second substrate of the switch liquid crystal panel.

FIG. 6B is a plan view illustrating a configuration of the second substrate 22 of the switch liquid crystal panel 20. On the second substrate 22, a second electrode group 221 is formed. The second electrode group 221 includes a plurality of electrodes arranged in the x direction at the electrode intervals BP. Each of the electrodes extends in the y direction, and they are arranged in parallel with one another.

On the second substrate 22, there is further formed a line group 222 that is electrically connected with the second electrode group 221. The line group 222 is preferably formed outside the active area AA, as is the case with the line group 212.

To the first electrode group 211 and the second electrode group 221, signals of twelve systems, i.e., signals $V_A$ to $V_L$, are supplied form the control unit 40. More specifically, to the first electrode group 211, signals of six systems, i.e., signals $V_B$, $V_D$, $V_F$, $V_H$, $V_J$, and $V_L$ are supplied via the line group 212. To the second electrode group 221, signals of six systems, i.e., signals $V_A$, $V_C$, $V_E$, $V_G$, $V_I$, and $V_K$ are supplied via the line group 222.

Hereinafter, the electrodes to which the signals $V_B$, $V_D$, $V_F$, $V_H$, $V_J$, and $V_L$ are supplied, among the electrodes of the first electrode group 211, are referred to as electrodes 211B, 211D, 211F, 211H, 211J, and 211L, respectively. Further, lines electrically connected with the electrodes 211B, 211D, 211F, 211H, 211J, and 211L are referred to as lines 212B, 212D, 212F, 212H, 212J, and 212L, respectively.

Regarding the electrodes of the second electrode group 221, similarly, the electrodes to which the signals $V_A$, $V_C$, $V_E$, $V_G$, $V_I$, and $V_K$ are supplied are referred to as electrodes 221A, 221C, 221E, 221G, 221I, and 221K, respectively. Further, the lines electrically connected with the electrodes 221A, 221C, 221E, 221G, 221I, and 221K are referred to as lines 222A, 222C, 222E, 222G, 222I, and 222K, respectively.

The electrodes 211B, 211D, 211F, 211H, 211J, and 211L are arranged in periodic fashion in the x direction in the stated order. In other words, the configuration is such that the same signal should be supplied to a certain electrode, and an electrode that is sixth with respect to the certain electrode.

Similarly, the electrodes 221A, 221C, 221E, 221G, 221I, and 221K are arranged in periodic fashion in the x direction in the stated order.

Figure 7:
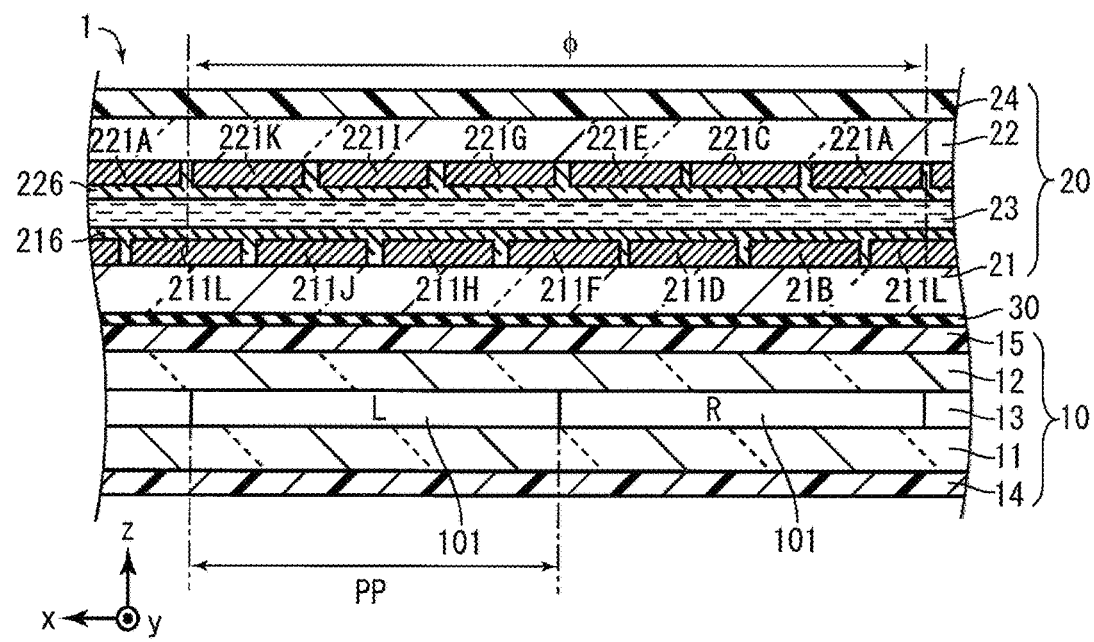
FIG. 7 is a cross-sectional view illustrating a schematic configuration of a stereoscopic display device according to Embodiment 1 of the present invention.
Figure 8:
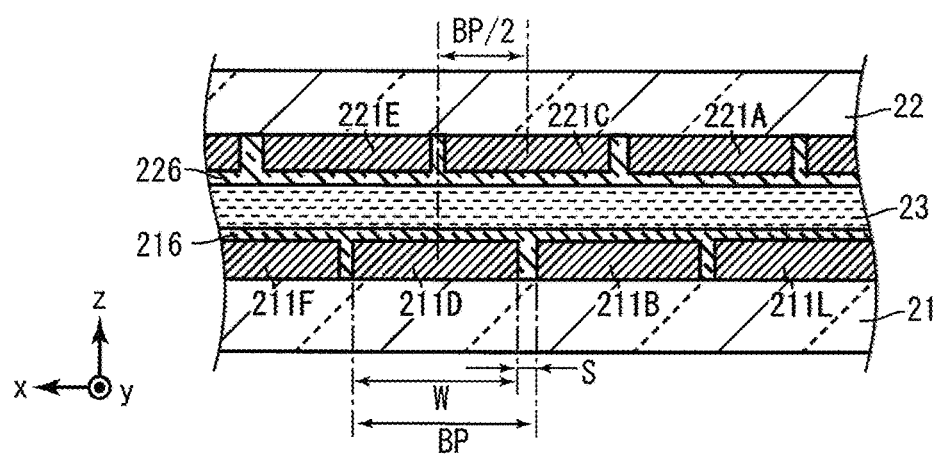
FIG. 8 is an enlarged cross-sectional view illustrating a part of the switch liquid crystal panel.

FIG. 7 is a cross-sectional view illustrating a schematic configuration of the stereoscopic display device 1. FIG. 8 is an enlarged cross-sectional view illustrating a part of the switch liquid crystal panel 20. As illustrated in FIGS. 7 and 8, the first electrode group 211 and the second electrode group 221 are arranged so as to be deviated with respect to each other in the x direction. Preferably, the first electrode group 211 and the second electrode group 221 are arranged so as to be deviated with respect to each other in the x direction by half of the electrode interval BP as in the example illustrated in FIG. 8.

It should be noted that the electrode interval BP is a sum of the width W of the electrode and the clearance S between the electrodes. In the present embodiment, the configuration satisfies BP=$\phi$/6≈PP/3.

Alignment films 216 and 226 are formed on the first substrate 21 and the second substrate 22, respectively. The alignment film 216 formed on the first substrate 21 and the alignment film 226 formed on the second substrate 22 are rubbed in directions that intersect with each other, respectively. This causes the liquid crystal molecules of the liquid crystal layer 23 to be aligned in a state of the so-called twisted nematic alignment, in which, in a state where no voltage is applied, the alignment direction rotates (twists), as it goes from the first substrate 21 toward the second substrate 22.

The polarizing plate 15 and the polarizing plate 24 are arranged in such a manner that the light transmission axes thereof intersect each other. In other words, the liquid crystal of the switch liquid crystal panel 20 is so-called normally white liquid crystal, in which the maximum transmittance is obtained when no voltage is applied to the liquid crystal layer 23.

Regarding the configuration of the alignment film, as is the case with the switch liquid crystal panel 20, twisted nematic, which provides high transmittance, is preferably used. Further, regarding the configuration of the polarizing plate, normally white is preferable. Normally white liquid crystal is in a no-voltage-applied state in the two-dimensional display mode, which enables to reduce electric power consumption.

In the present embodiment, the alignment films 216 and 226 are rubbed so that the viewing angle direction, which is to be described below, is parallel to the vertical direction (the y direction). Further, an intersection angle, which is the angle formed between the transmission axis of the polarizing plate 15 and the rubbing direction of the alignment film 216, is in a range of 0° exclusive to 45° inclusive. Still further, the retardation of the liquid crystal layer 23 is set to 380 nm to 466 nm when the intersection angle is in a range of 0° exclusive to 18° inclusive, and is set to 410 nm to 450 nm when the intersection angle is in a range of 18° exclusive to 45° inclusive. The rubbing directions of the alignment films 216 and 226, the transmission axis directions of the polarizing plates 15 and 24, and the retardation of the liquid crystal layer 23 are to be described below with reference to specific configuration examples.

Figure 9A:
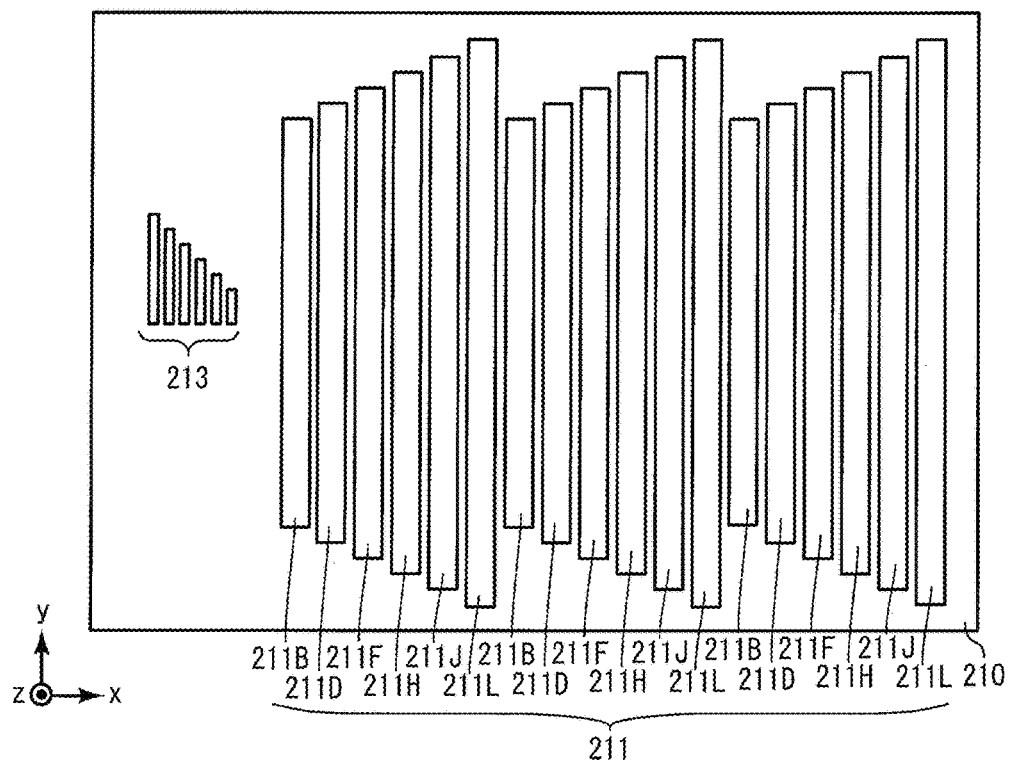
FIG. 9A is a view for explaining an exemplary method for producing the first substrate.
Figure 9B:
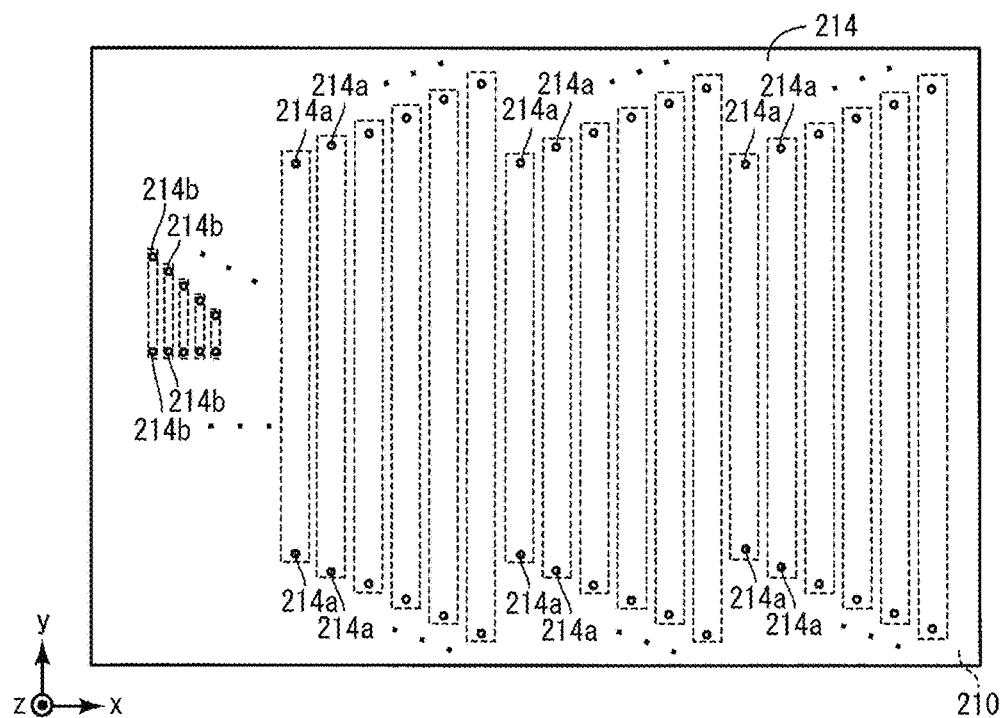
FIG. 9B is a view for explaining an exemplary method for producing the first substrate.
Figure 9C:
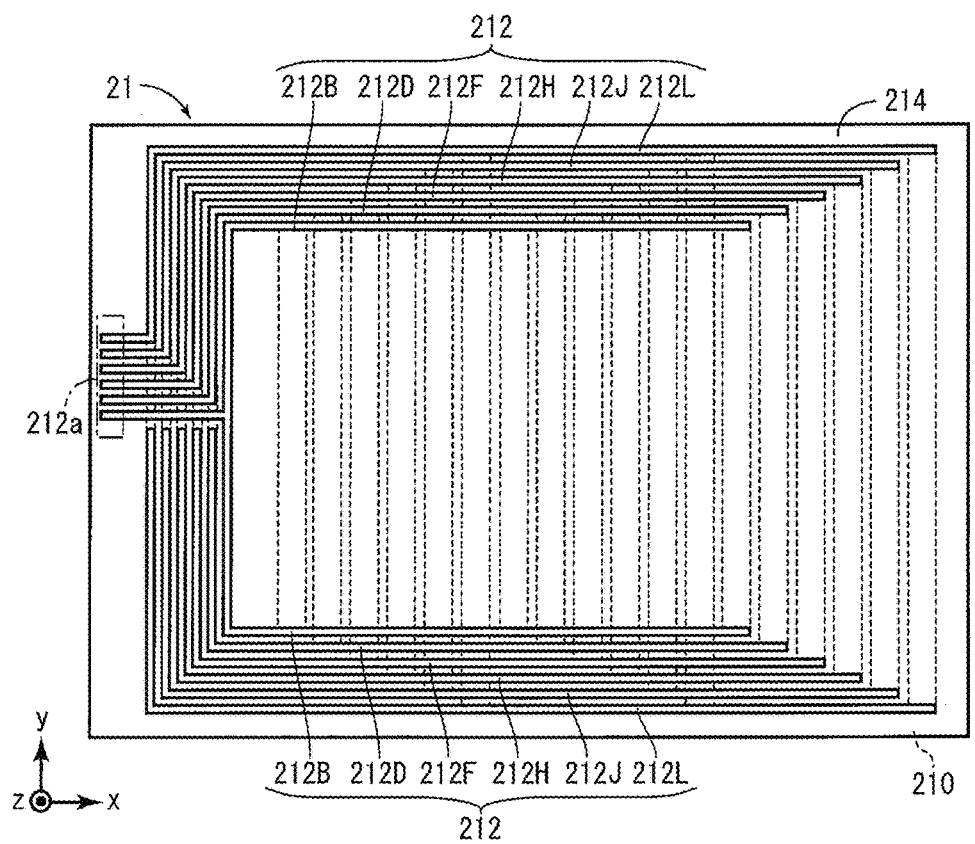
FIG. 9C is a view for explaining an exemplary method for producing the first substrate.

The following description explains an exemplary specific configuration of the first substrate 21, and an exemplary specific method for producing the same, while referring to FIGS. 9A to 9C. The second substrate 22 can be formed to have the same configuration as that of the first substrate 21, and can be produced by the same method as that for the first substrate 21.

First of all, as illustrated in FIG. 9A, the first electrode group 211 and the relay electrodes 213 are formed on the substrate 210. The relay electrodes 213 are electrodes for relaying the line group 212 that is to be formed in a later step. The substrate 210 is a substrate that has translucency and insulation properties, for example, a glass substrate. The first electrode group 211 preferably has translucency. In a case where the relay electrodes 213 are formed within the active area, the relay electrodes 213 also preferably have translucency. On the other hand, in a case where the relay electrodes 213 are formed outside the active area, the relay electrodes 213 are not required to have translucency. The first electrode group 211 and the relay electrodes 213 are made of, for example, ITO (indium tin oxide). In a case where the relay electrodes 213 are formed outside the active area, the relay electrodes 213 may be made of, for example, aluminum. The first electrode group 211 and the relay electrodes 213 are formed by the following process, for example: films are formed by sputtering or CVD (chemical vapor deposition), and are patterned by photolithography.

Next, as illustrated in FIG. 9B, an insulating film 214 is formed so as to cover the substrate 210, the first electrode group 211, and the relay electrodes 213. In the insulating film 214, contact holes 214a and contact holes 214b are formed. The contact holes 214a are formed at such positions as to allow the first electrode group 211 and the line group 212, which is to be formed in the next step, to be connected with each other. The contact holes 214b are formed at such positions as to allow the relay electrodes 213 and the line group 212 to be connected with each other.

The insulating film 214 preferably has translucency, and is made of, for example, SiN. The insulating film 214, for example, is formed with a film formed by CVD, and contact holes 214a and contact holes 214b are formed therein by photolithography. In a case where the line group 212 is formed outside the active area, the patterning may be performed in such a manner that the insulating film 214 is formed only outside the active area.

Next, as illustrated in FIG. 9C, the line group 212 is formed. The line group 212 is connected via the contact holes 214a to the first electrode group 211, and is connected via the contact holes 214b to the relay electrodes 213. The line group 212 preferably has high conductivity, and is made of, for example, aluminum. The line group 212 may be made of ITO. The line group 212 is formed by the following process, for example: a film is formed by sputtering, and is patterned by photolithography.

As described above, the electrodes 211B, 211D, 211F, 211H, 211J, and 211L are connected with the lines 212B, 212D, 212F, 212H, 212J, and 212L, respectively. With this three-layer configuration of the first electrode group 211, the insulating layer 214, and the line group 212, the first electrode group 211 and the line group 212 are caused to intersect as viewed in a plan view.

In the example illustrated in FIG. 9C, ends on one side of the line group 212 are gathered in the vicinities of a peripheral part of the substrate 21, and form a terminal part 212a. To the terminal part 212a, a FPC (flexible printed circuit) and the like is connected.

In the example illustrated in FIG. 9C, lines are connected to ends on both sides in the y direction of each electrode of the electrode group 211. The pair of lines connected to ends on both sides in the y direction of each electrode of the electrode group 211 are connected with each other by the relay electrodes 213. By applying a signal from both ends in the y direction of each electrode of the electrode group 211, a potential difference in the inside of each electrode can be reduced.

[Method for Driving Switch Liquid Crystal Panel 20]

Next, a method for driving the switch liquid crystal panel 20 is described with reference to FIGS. 10A and 10B.

Figure 10A:
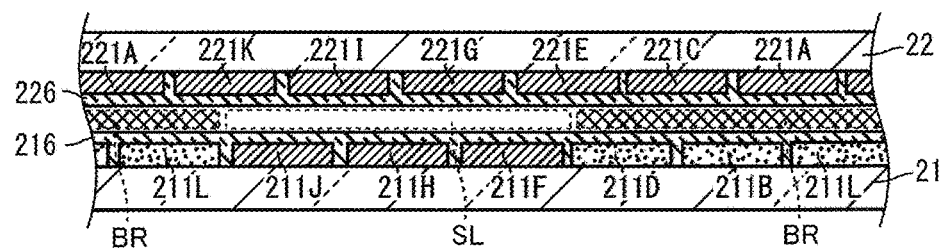
FIG. 10A is a cross-sectional view schematically illustrating a barrier lighting state to be displayed on the switch liquid crystal panel.

FIG. 10A is a cross-sectional view schematically illustrating a barrier lighting state to be displayed on the switch liquid crystal panel 20. The control unit 40 (FIG. 2) causes electrodes included in one electrode group selected from the first electrode group 211 and the second electrode group 221, and the other electrodes, to have opposite polarities, respectively. In FIG. 10A, the electrodes having a different polarity are schematically indicated, being denoted with a sandy pattern. The same indication is used in FIG. 10B.

In the example illustrated in FIG. 10A, the electrodes 211B, 211D, 211L included in the second electrode group 211, and the other electrodes (the electrodes 211F, 211H, 211J, and the electrodes 221A to 221K) are set to opposite polarities.

This allows a potential difference to occur between the electrode 221A and the electrode 211B, thereby causing the liquid crystal molecules of the liquid crystal layer 23 therebetween to be aligned in the z direction. The switch liquid crystal panel 20 is normally white liquid crystal. Therefore, the barrier BR is formed in a portion where the electrode 221A and the electrode 211B overlap as viewed in a plan view (the xy plan view). Similarly, the barriers BR are formed in portions where the electrode 211B and the electrode 221C overlap, the electrode 221C and the electrode 211D overlap, the electrode 211D and the electrode 221E overlap, the electrode 221K and the electrode 211L overlap, and the electrode 211L and the electrode 221A overlap, as viewed in the plan view.

On the other hand, no potential difference occurs to between the electrode 221E and the electrode 211F. As described above, the switch liquid crystal panel 20 is normally white liquid crystal. Therefore, the slit SL is formed in a portion where the electrode 221E and the electrode 211F overlap as viewed in the plan view. Similarly, the slits SL are formed in portions where the electrode 211F and the electrode 221G overlap, the electrode 221G and the electrode 211H overlap, the electrode 211H and the electrode 221I overlap, the electrode 221I and the electrode 211J overlap, as well as the electrode 211J and the electrode 221K overlap, as viewed in a plan view.

As a result, the barrier BR is formed in a portion that overlaps the electrodes 211B, 211D, and 211L, as viewed in a plan view, and the slit SL is formed in a portion that overlaps the electrodes 211F, 211H, and 211J as viewed in a plan view.

Figure 10B:
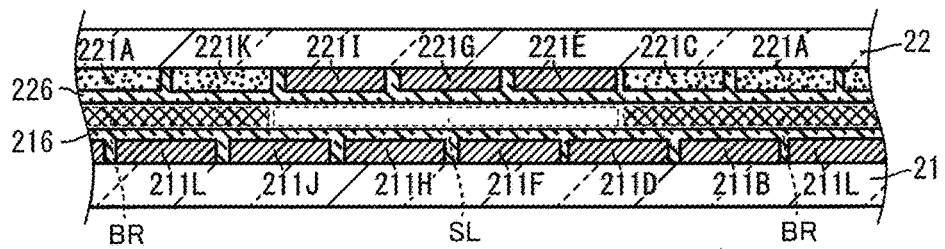
FIG. 10B is a cross-sectional view schematically illustrating another barrier lighting state to be displayed on the switch liquid crystal panel.

FIG. 10B is a cross-sectional view schematically illustrating another barrier lighting state to be displayed on the switch liquid crystal panel 20.

In the example illustrated in FIG. 10B, electrodes 221A, 221C, 221K included in the second electrode group 221, and the other electrodes (the electrodes 221E, 221G, 221I, and 211B to 211L) are caused to have opposite polarities, respectively. This causes a barrier BR to be formed in a portion that overlaps the electrodes 221A, 221C, and 221K as viewed in a plan view, and causes a slit SL to be formed in a portion that overlaps the electrodes 221E, 221G, and 221I as viewed in a plan view.

As is clear from comparison between FIG. 10A and FIG. 10B, with this configuration of the switch liquid crystal panel 20, the barrier lighting state can be controlled using half of the electrode interval BP as a minimum unit.

Configuration Example 1

Hereinafter, several specific configuration examples of the stereoscopic display device 1 according to the present embodiment, as well as a comparative example, are described. FIG. 11 is a table illustrating one example of settings of the display panel 10 and the switch liquid crystal panel 20 of the stereoscopic display device 1. FIG. 12 is a plan view schematically illustrating a transmission axis DR0 of the polarizing plate 15, a rubbing direction DR1 of the alignment film 216, and a rubbing direction DR2 of the alignment film 226, in one configuration example of the stereoscopic display device 1 according to Embodiment 1.

Here, to indicate a direction (an axis angle), the following coordinate system is used. As illustrated in FIG. 12, the six-o'clock direction as viewed from the viewer side is assumed to be a direction at 0°, and the counterclockwise direction is assumed to be a plus direction. According to this coordinate system, for example, the three-o'clock direction as viewed from the viewer side is a direction at 90°, and the nine-o'clock direction as viewed from the viewer side is a direction at 270° (−90°).

As illustrated in FIG. 11, in this configuration example, an in-plane switching (IPS) liquid crystal display panel was used as the display panel 10. The display panel 10 was a 4.7-inch full high definition display panel (1980 pixels× 1080 pixels), and the pixel pitch in the horizontal direction was 53.7 μm. The axis angle of the transmission axis of the polarizing plate 14 (the polarizing plate on the light source side) was 0°, and the axis angle of the transmission axis of the polarizing plate 15 (the polarizing plate on the emission side) was 90°.

In this configuration example, the axis angle of the rubbing direction DR1 of the alignment film 216 of the liquid crystal layer 23 of the switch liquid crystal panel 20 (the alignment film on the polarizing plate 15 side) was set to 45°, and the axis angle of the rubbing direction DR2 of the alignment film 226 (the alignment film on the polarizing plate 24 side) was set to 135°. The axis angle of the transmission axis of the polarizing plate 24 was set to 0°. In other words, the switch liquid crystal panel 20 in this configuration example was normally white TN liquid crystal with a twist angle of 90°.

Liquid crystal molecules in the liquid crystal layer 23 were aligned, in the vicinities of the alignment film 216, in such a manner that the molecule long axis was parallel to the rubbing direction DR1, and in the vicinities of the alignment film 226, the same were aligned in such a manner that the molecule long axis was parallel to the rubbing direction DR2. A pretilt angle was imparted to the liquid crystal molecules by a rubbing treatment. In other words, the liquid crystal molecules rose toward the rubbing direction (in the direction toward the end of DR1 or DR2 in FIG. 12). In a state where no voltage was applied, therefore, the liquid crystal molecules rotated as indicated by a void arrow in FIG. 12, as it went from the first substrate 21 to the second substrate 22.

The ellipse denoted by the reference symbol of 23a in FIG. 12 schematically indicates the alignment direction of liquid crystal molecules in the vicinities of the center of the liquid crystal layer 23 in the thickness direction (the z direction). The direction parallel to the molecule long axis of liquid crystal molecules in the center of the liquid crystal layer 23 in the thickness direction is defined as a "viewing angle direction". As illustrated in FIG. 12, in this configuration example, the viewing angle direction was parallel to the vertical direction (the y direction).

As will be described later, the viewing angle properties can be made horizontally symmetric by making the viewing angle direction parallel to the vertical direction. Further, by making the viewing angle direction parallel to the vertical direction, the difference in the response time of liquid crystal between a case where the parallax barrier is moved rightward and a case where the parallax barrier is moved leftward can be decreased.

The angle formed between the transmission axis DR0 of the polarizing plate 15 and the rubbing direction of the alignment film 216 is defined as the "intersection angle". As illustrated in FIG. 11, in this configuration example, the intersection angle was 45°.

In the above-described configuration, a configuration in which the retardation of the switch liquid crystal panel 20 was set to 419 nm is given as a configuration example 1-1, and a configuration in which the retardation of the switch liquid crystal panel 20 was set to 450 nm is given as a configuration example 1-2.

Comparative Example

FIG. 13 is a plan view schematically illustrating a transmission axis DR0 of a polarizing plate 15, a rubbing direction DR1 of the alignment film 216, and a rubbing direction DR2 of the alignment film 226, in a stereoscopic display device according to a comparative example. In the comparative example, the alignment films 216 and 226 were rubbed so that the intersection angle was 0°. In other words, in the stereoscopic display device according to the comparative example, the axis angle of the rubbing direction of the alignment film 216 was 90°, and the axis angle of the rubbing direction of the alignment film 226 was 180°. The viewing angle direction of the stereoscopic display device was 45°.

In a case where the intersection angle is 0°, when the retardation Δn·d satisfies the following formula, the transmittance in a state where no voltage is applied can be maximized:

$$\Delta n \cdot d = (m^2 - (\phi/\pi)^2)^{1/2} \cdot \lambda$$

where $\phi$ represents the twist angle, $\lambda$ represents the wavelength of light, and m represents an integer.

The values of the retardation Δn·d derived from this formula are referred to as, in the increasing order of the value, the first minimum ($1^{st}$-minimum), the second minimum ($2^{nd}$-minimum), and so on, respectively. More specifically, when $\phi=90°$ and $\lambda=589$ nm are assumed, the following are obtained: the $1^{st}$-min. is $\Delta n \cdot d = 3^{1/2} \lambda / 2 \approx 510$ nm; and $2^{nd}$-min. is $15^{1/2} \cdot \lambda/2 \approx 1141$ nm.

The stereoscopic display device according to the comparative example had retardation set to 514 nm in the vicinities of the 1st-min.

[Evaluation]

Figure 14:
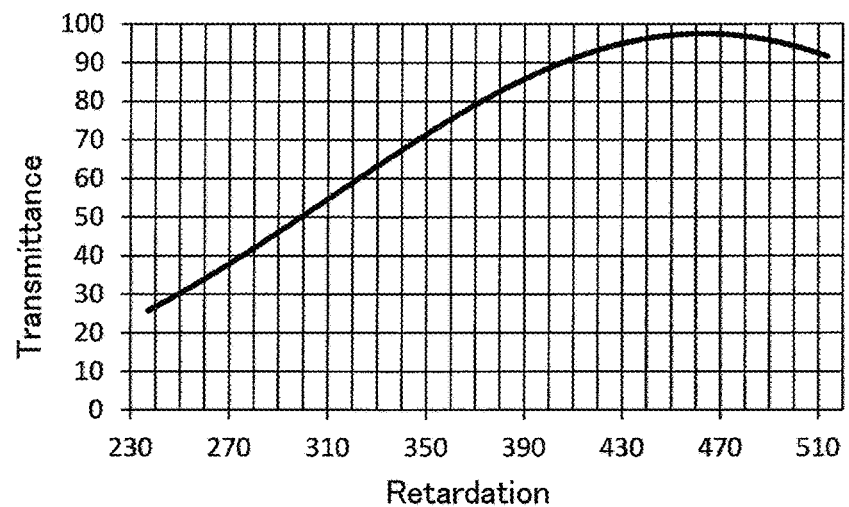
FIG. 14 is a graph illustrating the relationship between retardation of a liquid crystal layer and transmittance of a switch liquid crystal panel.

Various properties of the stereoscopic display devices according to the configuration examples and the comparative example were evaluated by optical simulation. FIG. 14 is a graph illustrating the relationship between the retardation of the liquid crystal layer 23 and the transmittance of the switch liquid crystal panel 20. The vertical axis in FIG. 14 plots the transmittance standardized by the transmittance, given as 100, of the switch liquid crystal panel of the stereoscopic display device according to the comparative example.

As is clear from FIG. 14, when the intersection angle is 45°, if the retardation is 410 nm or more, the decrease of the transmittance as compared with that of the comparative example can be controlled within 10%.

Figure 15:
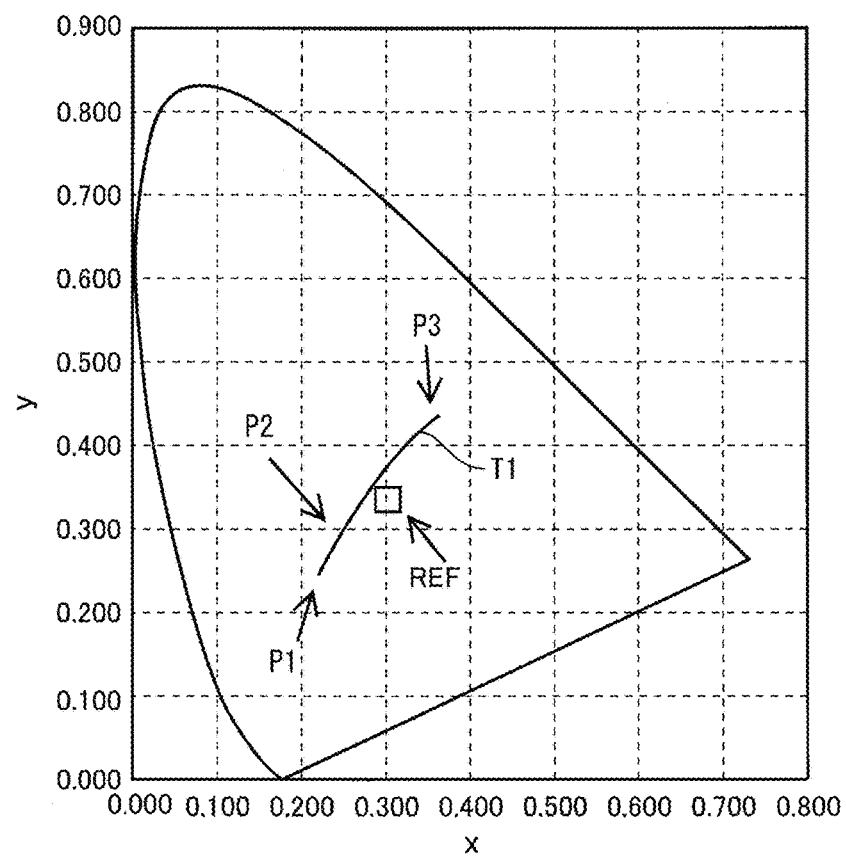
FIG. 15 illustrates the relationship between retardation of a liquid crystal layer and chromaticity shift due to the switch liquid crystal panel, on an xy chromaticity diagram.

FIG. 15 illustrates the relationship between the retardation of a liquid crystal layer 23 and chromaticity shift due to the switch liquid crystal panel 20, on the xy chromaticity diagram. The curve T1 in FIG. 15 indicates a locus of changes of the chromaticity viewed from the right front when retardation of the stereoscopic display device of the configuration example was varied.

The mark denoted by the reference symbol REF in FIG. 15 indicates chromaticity when the stereoscopic display device according to the comparative example was viewed from the right front. The chromaticity when the stereoscopic display device of the comparative example was viewed from the right front was (x, y)=(0.3024, 0.3417).

The point P1 on the curve T1 indicates chromaticity when the retardation was 237 nm. Similarly, the point P2 indicates chromaticity when the retardation was 351 nm, and the point P3 indicates chromaticity when the retardation was 514 nm. From FIG. 15, it is clear that as the retardation decreased, the chromaticity shifted to blue color, and as the retardation increased, the chromaticity shifted toward yellow color.

Figures 16, 17A:
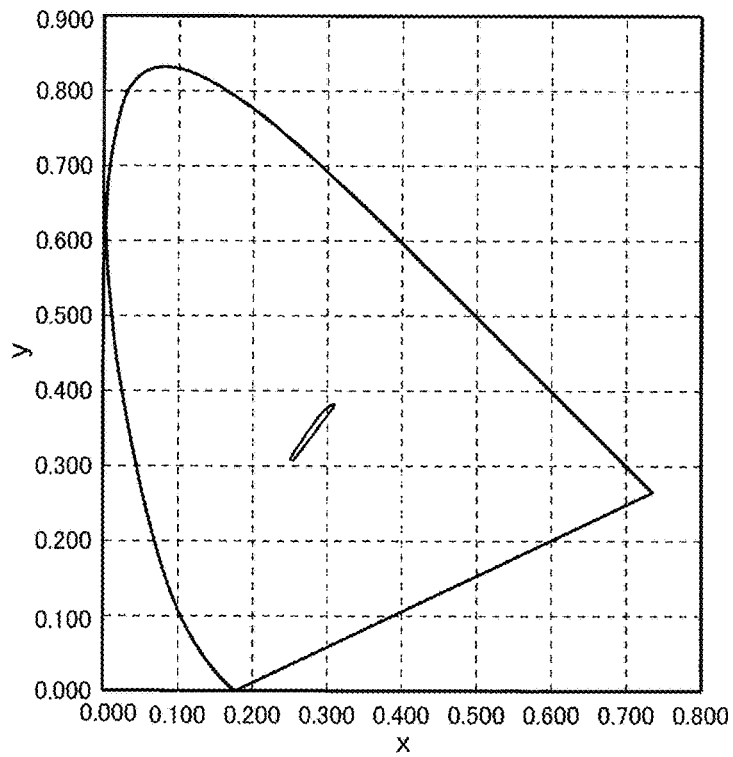
FIG. 16 is a table in which transmittance reduction ratios and chromaticity shifts ($\Delta x$, $\Delta y$) when the retardation of the liquid crystal layer is varied are compiled.
FIG. 17A illustrates, on an xy chromaticity diagram, a chromaticity range when a stereoscopic display device according to a configuration example 1-1 is viewed from a variety of angles.

FIG. 16 is a table in which transmittance decrease ratios and chromaticity shifts (Δx, Δy) when the retardation of the liquid crystal layer was varied are compiled. As mentioned above, in the case where the intersection angle was 45°, when the retardation was 410 nm or more, the decrease in luminance was controlled within 10%. Besides, in a case where the intersection angle was 45°, when the retardation was 450 nm or less, the chromaticity shift Δy was controlled to 0.035 or less. In a case where the decrease in luminance and the chromaticity shift are within the above-described ranges, these are ranges to which adjustment by other members is effective, and such a panel can be used as the switch liquid crystal panel.

Figure 17B:
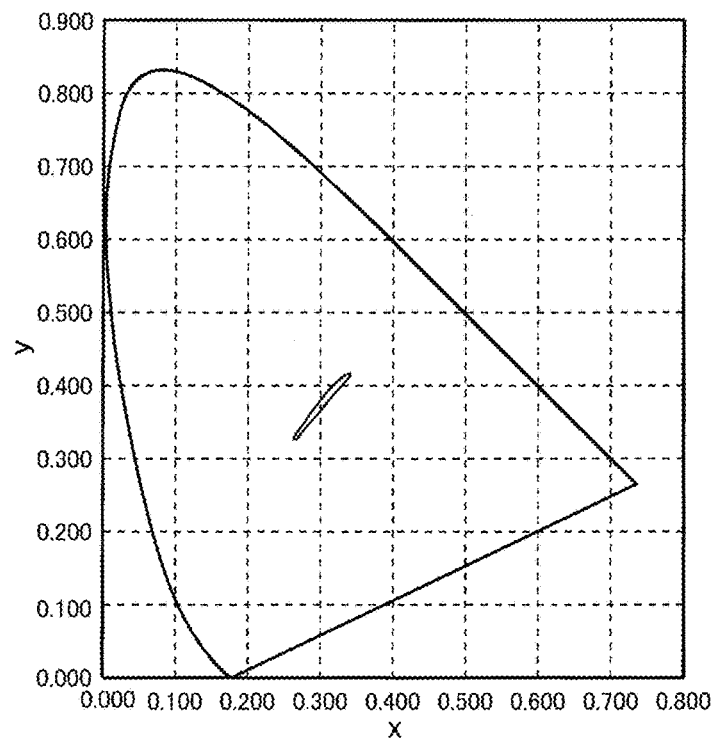
FIG. 17B illustrates, on an xy chromaticity diagram, a chromaticity range when a stereoscopic display device according to a configuration example 1-2 is viewed from a variety of angles.
Figure 17C:
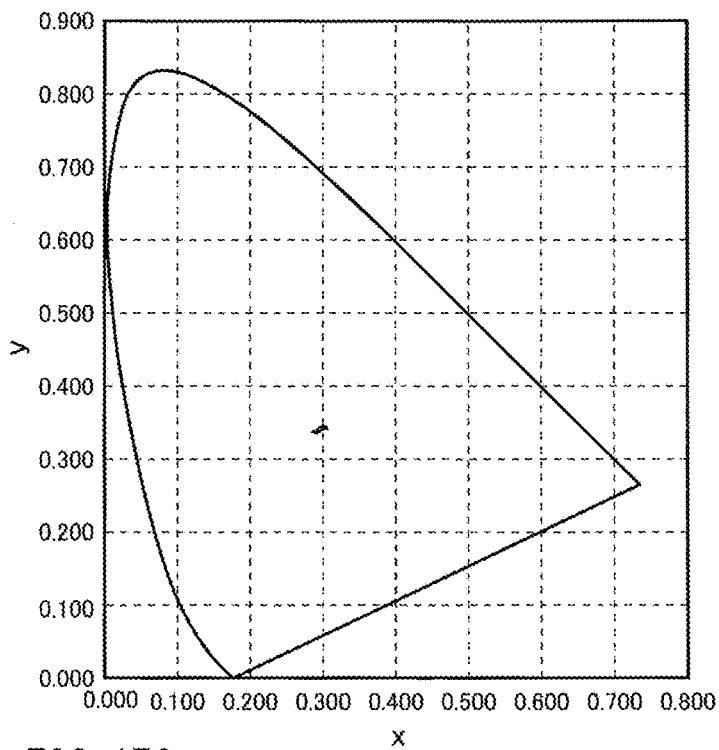
FIG. 17C illustrates, on an xy chromaticity diagram, a chromaticity range when a stereoscopic display device according to a comparative example is viewed from a variety of angles.

Next, chromaticity shifts in all orientations in the stereoscopic display devices according to the configuration examples and the comparative example are compared. FIG. 17A illustrates, on an xy chromaticity diagram, a chromaticity range when the stereoscopic display device according to the configuration example 1-1 was viewed from a variety of angles. Similarly, FIG. 17B illustrates a chromaticity range of the stereoscopic display device according to the configuration example 1-2, and FIG. 17C illustrates a chromaticity range of the stereoscopic display device according to the comparative example.

The chromaticity range of the stereoscopic display device according to the configuration example 1-1 had an x-direction width of 0.0564 (from 0.2518 to 0.3082), and a y-direction width of 0.0745 (from 0.3069 to 0.3814). The chromaticity range of the stereoscopic display device according to the configuration example 1-2 had an x-direction width of 0.0742 (from 0.2647 to 0.3389), and a y-direction width of 0.0889 (from 0.3267 to 0.4155). The chromaticity range of the stereoscopic display device according to the comparative example had an x-direction width of 0.0162 (from 0.2885 to 0.3047), and a y-direction width of 0.0083 (from 0.3347 to 0.3430).

The widths of chromaticity shift in the stereoscopic display devices according to the configuration example 1-1 and the configuration example 1-2 were greater as compared with the width of the chromaticity shift in the stereoscopic display device according to the comparative example, but it was at a level that does not matter.

Figure 18A:
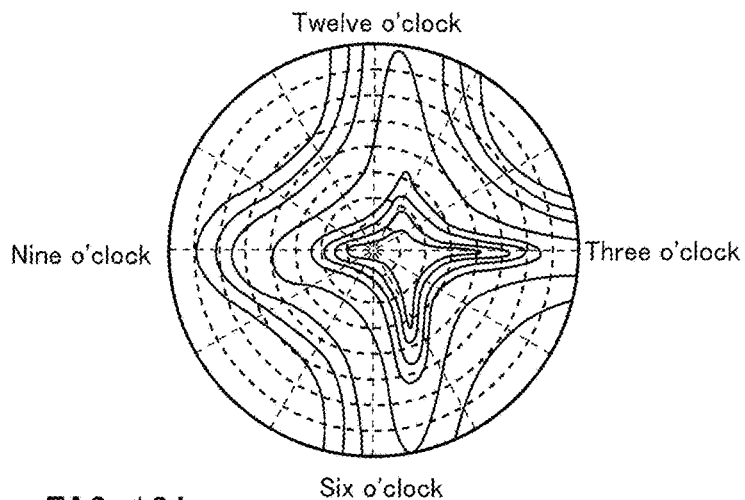
FIG. 18A illustrates contrast properties of a switch liquid crystal panel of the stereoscopic display device according to the configuration example 1-1.
Figure 18B:
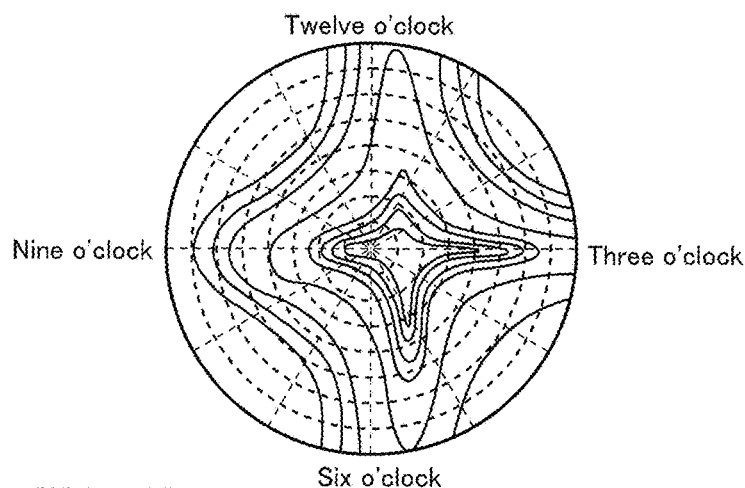
FIG. 18B illustrates contrast properties of a switch liquid crystal panel of the stereoscopic display device according to the configuration example 1-2.
Figure 18C:
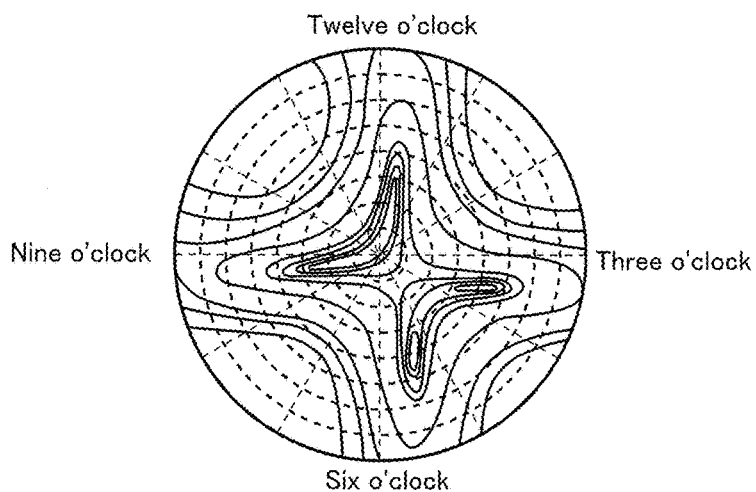
FIG. 18C illustrates contrast properties of a switch liquid crystal panel of the stereoscopic display device according to the comparative example.
Figure 18D:
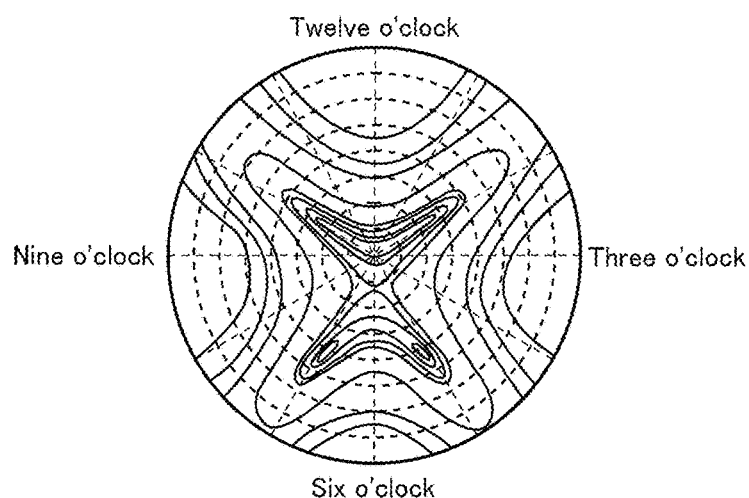
FIG. 18D illustrates contrast properties of a switch liquid crystal panel of the stereoscopic display device according to the comparative example, in a case where the viewing angle direction is set to the six-o'clock direction.

Next, the contrast properties of the switch liquid crystal panels 20 of the stereoscopic display devices according to configuration examples and the comparative example are compared. FIG. 18A illustrates contrast properties of the switch liquid crystal panel 20 of the stereoscopic display device according to the configuration example 1-1. Similarly, FIG. 18B illustrates contrast properties of the switch liquid crystal panel 20 of the stereoscopic display device according to the configuration example 1-2, and FIG. 18C illustrates contrast properties of the switch liquid crystal panel 20 of the stereoscopic display device according to the comparative example. FIG. 18D illustrates contrast properties of the switch liquid crystal panel 20 of the stereoscopic display device according to the comparative example, in a case where the viewing angle direction was set to the six-o'clock direction.

In the stereoscopic display device according to the configuration examples 1-1 and 1-2 in which the viewing angle direction was set to the six'-o'clock direction (the vertical direction), horizontally symmetric contrast properties were obtained, as compared with the stereoscopic display device according to the comparative example, in which the viewing angle direction was set to the four-o'clock direction.

Figure 19A:
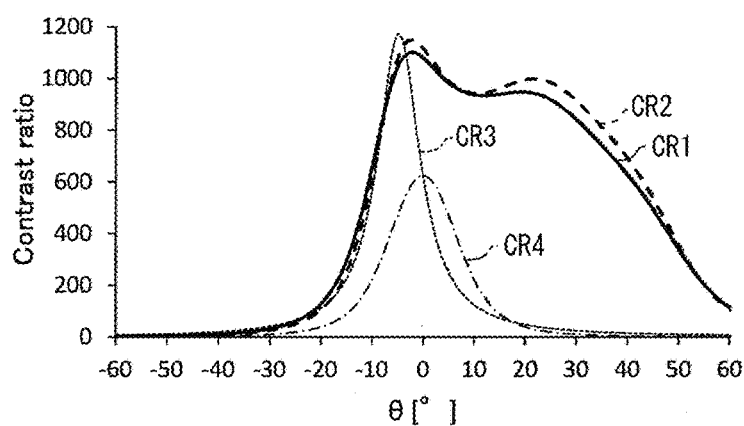
FIG. 19A is a graph illustrating contrast properties along the three-o'clock to nine-o'clock direction of the stereoscopic display devices.
Figure 19B:
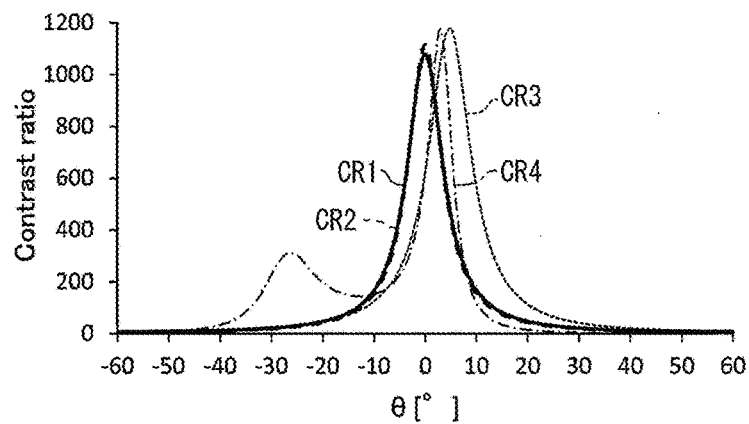
FIG. 19B is a graph illustrating contrast properties along the six-o'clock to twelve-o'clock direction of the stereoscopic display devices.

FIG. 19A is a graph illustrating contrast properties along the three-o'clock to nine-o'clock direction of the stereoscopic display devices. FIG. 19B is a graph illustrating contrast properties along the six-o'clock to twelve-o'clock direction of the stereoscopic display devices. In FIGS. 19A and 19B, the curve CR1 indicates contrast properties in the stereoscopic display device according to the configuration example 1-1, and the curve CR2 indicates the contrast properties of the stereoscopic display device according to the configuration example 1-2. The curve CR3 indicates the contrast properties of the stereoscopic display device according to the comparative example, and the curve CR4 indicates the contrast properties in the case of FIG. 18D.

In the stereoscopic display devices according to the configuration examples 1-1 and 1-2, an area with high contrast extends not only in the right front direction, but also in the three-o'clock to six-o'clock direction and in the six-o'clock to twelve-o'clock direction. Further, as compared with the comparative example, a high contrast was obtained as a whole.

By increasing the contrast of the switch liquid crystal panel 20, crosstalk can be reduced. To illustrate this principle, crosstalk is quantitatively defined herein by using FIG. 20.

Figure 20:
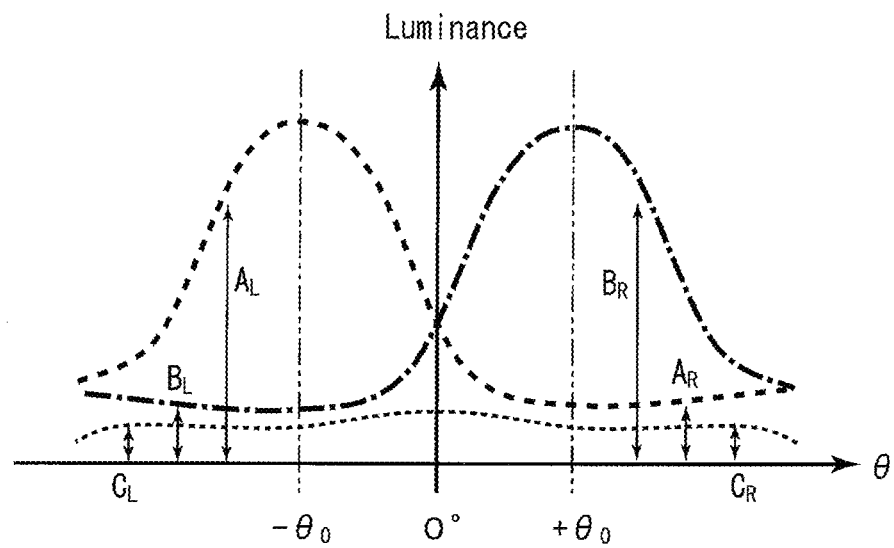
FIG. 20 is a diagram for explaining crosstalk.

FIG. 20 illustrates angle properties of luminance of the stereoscopic display device in a case where the barrier lighting state is fixed. Luminance $A_L$ is luminance detected in an angle range satisfying "the angle θ<0" when a black image is displayed as a right-eye image and a white image is displayed as a left-eye image. Luminance $A_R$ is luminance detected on the same screen in an angle range satisfying "the angle θ>0". Luminance $B_L$ is luminance detected in an angle range satisfying "the angle θ<0" when a white image is displayed as a right-eye image and a black image is displayed as a left-eye image. Luminance $B_R$ is luminance detected on the same screen in an angle range satisfying "the angle θ>0". Luminance $C_L$ is luminance detected in an angle range satisfying "the angle θ<0" when black images are displayed as both of the right-eye image and the left-eye image. Luminance $C_R$ is luminance detected on the same screen in an angle range satisfying "the angle θ>0".

Here, crosstalk XT(L) for the left eye is defined by the following expression:

$$XT(L)[\%] = \frac{B_L(\theta) - C_L(\theta)}{A_L(\theta) - C_L(\theta)} \times 100 \quad \text{[Formula 1]}$$

Similarly, crosstalk XT(R) for the right eye is defined by the following expression:

$$XT(R)[\%] = \frac{B_R(\theta) - C_R(\theta)}{A_R(\theta) - C_R(\theta)} \times 100 \quad \text{[Formula 2]}$$

Figure 21:
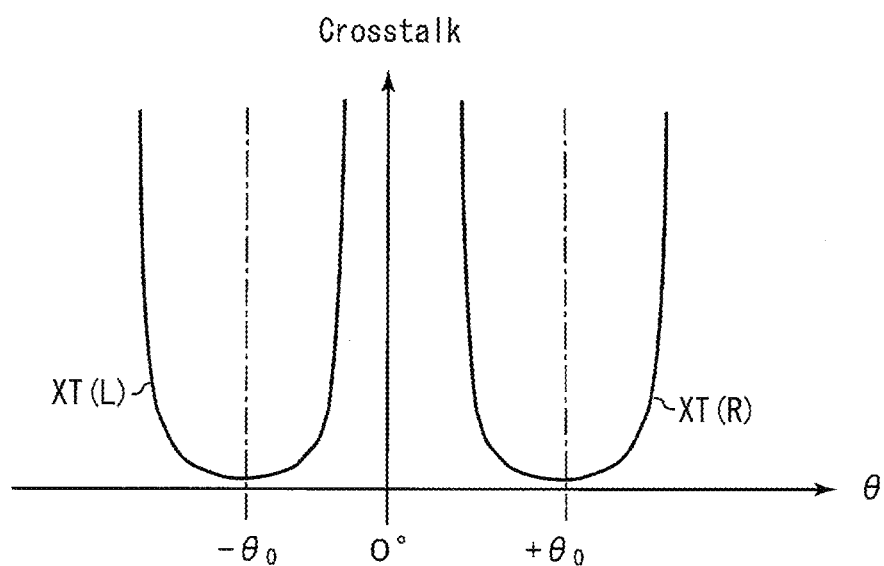
FIG. 21 illustrates angle properties of crosstalk XT(L) of the left eye and crosstalk XT(R) of the right eye.

FIG. 21 illustrates angle characteristics of crosstalk XT(L) for the left eye and crosstalk XT(R) for the right eye. The crosstalk XT(L) for the left eye has a minimum value at an angle $-\theta_0$, and increases as the angle increases/decreases from the angle $-\theta_0$. Similarly, the crosstalk XT(R) for the right eye has a minimum value at an angle $+\theta_0$, and increases as the angle increases/decreases from the angle $+\theta_0$.

The increase in the contrast of the switch liquid crystal panel 20 means that the ratio of shielding by the barriers and the ratio of transmittance by the slits increase. This allows $A_L$ and $B_R$ to increase further, while $A_L$ and $B_R$ decrease further. As a result, crosstalk can be reduced further.

Next, response times of the switch liquid crystal panels 20 of the stereoscopic display devices according to configuration example and the comparative example are compared. Here, a period of time from when the lighting of the barrier on the movement destination side is completed, until the extinction of the barrier on a side opposite to the movement destination side is completed is defined as "response time".

Figure 22A:
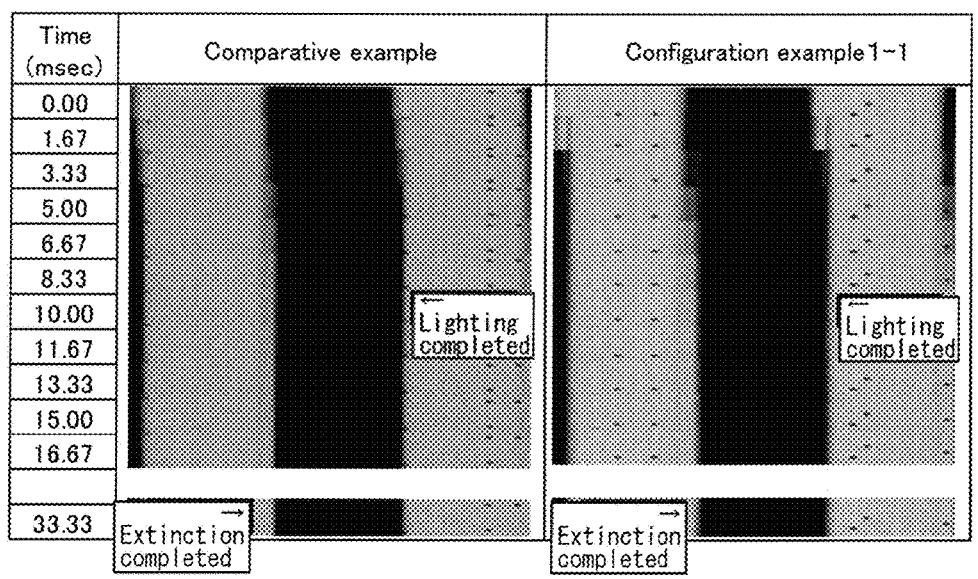
FIG. 22A illustrates temporal variation of a barrier lighting state when a barrier is moved from left to right.
Figure 22B:
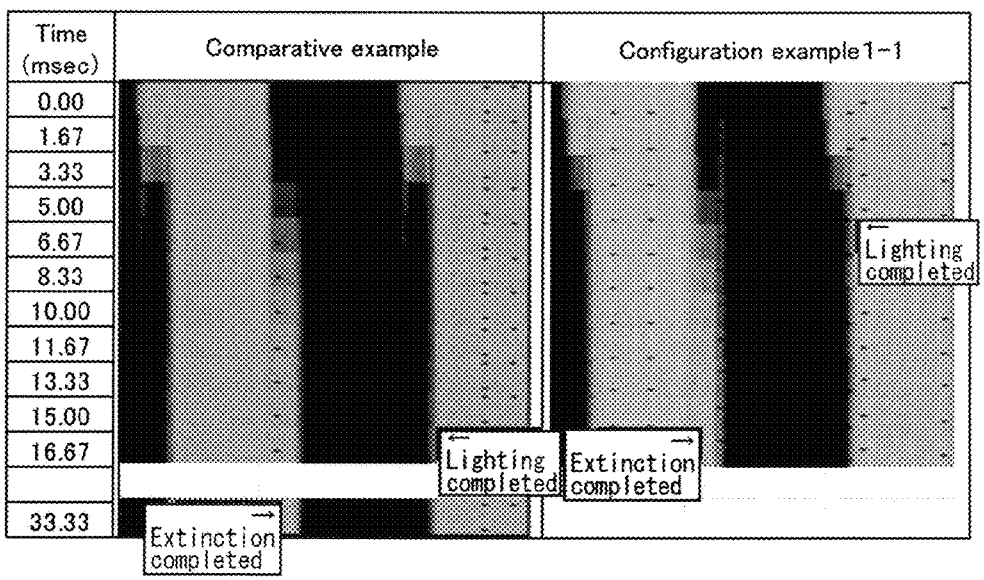
FIG. 22B illustrates temporal variation of a barrier lighting state when a barrier is moved from left to right.

FIGS. 22A and 22B illustrate temporal variation of a barrier lighting state when a barrier was moved from left to right. FIG. 22A illustrates temporal variation in a case of shift from a state where a part of the electrodes of the first electrode group 211 were caused to have an opposite polarity to a state where a part of electrodes of the second electrode group 221 were caused to have an opposite polarity (corresponding to the case of shift from FIG. 10A to FIG. 10B). FIG. 22B illustrates temporal variation in a case of shift from a state where a part of the electrodes of the second electrode group 221 were caused to have an opposite polarity to a state where a part of the electrodes of the first electrode group 211 were caused to have an opposite polarity.

FIGS. 22C and 22D illustrate temporal variation of a barrier lighting state when a barrier was moved from right to left. FIG. 22C illustrates temporal variation in a case of shift from a state where a part of the electrodes of the first electrode group 211 were caused to have an opposite polarity to a state where a part of electrodes of the second electrode group 221 were caused to have an opposite polarity. FIG. 22D illustrates temporal variation in a case of shift from a state where a part of the electrodes of the second electrode group 221 were caused to have an opposite polarity to a state where a part of the electrodes of the first electrode group 211 were caused to have an opposite polarity.

In the stereoscopic display device according to the comparative example, in the case of FIG. 22A, the lighting of the barrier on the right-hand side was completed 10 msec (milliseconds) after the signal application, and the extinction of the barrier on the left-hand side was completed 33 msec after. The response time was, therefore, 23 msec. Similarly, the response time in the case of FIG. 22B was 16 msec, the response time in the case of FIG. 23C was 77 msec, and the response time in the case of FIG. 23D was 26 msec.

On the other hand, in the stereoscopic display device according to the configuration example 1-1, the response time in the case of FIG. 22A was 23 msec, the response time in the case of FIG. 22B was 10 msec, the response time in the case of FIG. 22C was 5 msec, and the response time in the case of FIG. 22D was 7 msec.

FIG. 23 is a table in which response times of switch liquid crystal panels 20 of stereoscopic display devices according to a configuration example and a comparative example are compiled. As illustrated in FIG. 23, in the stereoscopic display device according to the comparative example, the response time in a case where the barrier was moved from right to left was at most 23 msec, and the response time in a case where the barrier was moved from left to right was at most 77 msec. On the other hand, in the stereoscopic display device according to the configuration example 1-1, the response time in a case where the barrier was moved from right to left was at most 23 msec, and the response time in a case where the barrier was moved from left to right was at most 7 msec.

In this way, in the stereoscopic display device according to the configuration example 1-1, the response time of the switch liquid crystal panel 20 can be reduced, as compared with the stereoscopic display device according to the comparative example. Besides, the difference between the case of movement to left and the case of movement to right can be decreased.

In the foregoing description, evaluation results regarding the stereoscopic display devices according to configuration example and the comparative example are described. As is clear from the above-described evaluation results, in the case where the intersection angle is 45°, decrease of luminance and chromaticity shift can be suppressed by setting retardation to 410 to 450 nm.

The above-described configuration example described above is an example in which the intersection angle was 45°. On the other hand, decrease of luminance and chromaticity shift become greater as the intersection angle is greater. In other words, as the intersection angle is smaller, decrease of luminance and chromaticity shift can be reduced further. Therefore, by setting retardation to a range of 410 nm to 450 nm both inclusive, an effect equal to or higher than the level of the above-described configuration example can be achieved, at any intersection angle equal to or smaller than 45°.

As is clear from the evaluation results of the configuration example, by making the viewing angle direction parallel to the vertical direction, the contrast properties can be equalized on the left and right sides. Further, by making the viewing angle direction parallel to the vertical direction, a difference of the response time of liquid crystal can be reduced between a case where the parallax barrier is moved to right and the case where the parallax barrier is moved to left.

Configuration Example 2

FIG. 24 is a table illustrating another example of settings of the display panel 10 and the switch liquid crystal panel 20 of the stereoscopic display device 1. FIG. 25 is a plan view schematically illustrating the transmission axis DR0 of the polarizing plate 15, the rubbing direction DR1 of the alignment film 216, and the rubbing direction DR2 of the alignment film 226, in this configuration example.

As illustrated in FIG. 24, in this configuration example, a vertical alignment (VA) type liquid crystal display panel was used as a display panel 10. The display panel 10 was a 4.7-inch full high definition display panel (1980 pixels× 1080 pixels), and the pixel pitch in the horizontal direction was 53.7 μm. The axis angle of the transmission axis of the polarizing plate 14 (the polarizing plate on the light source side) was 153°, and the axis angle of the transmission axis of the polarizing plate 15 (the polarizing plate on the emission side) was 63°.

In this configuration example, the axis angle of the rubbing direction DR1 of the alignment film 216 (the alignment film on the polarizing plate 15 side) of the liquid crystal layer 23 of the switch liquid crystal panel 20 was set to 45°, and the axis angle of the rubbing direction DR2 of the alignment film 226 (the alignment film on the polarizing plate 24 side) was set to 135°. The axis angle of the transmission axis of the polarizing plate 24 was set to 153°. In other words, the switch liquid crystal panel 20 in this configuration example was normally white TN liquid crystal with a twist angle of 90°.

The ellipse denoted by the reference symbol of 23a in FIG. 25 schematically indicates the alignment direction of liquid crystal molecules in the vicinities of the center of the liquid crystal layer 23 in the thickness direction (the z direction). In this configuration example as well, the viewing angle direction was parallel to the vertical direction In this configuration example, the intersection angle was 18°.

In the above-described configuration, a configuration in which the retardation of the switch liquid crystal panel 20 was set to 435 nm is given as a configuration example 2-1, and a configuration in which the retardation of the switch liquid crystal panel 20 was set to 466 nm is given as a configuration example 2-2.

FIG. 26 is a graph illustrating the relationship between the retardation of the liquid crystal layer 23 and the transmittance of the switch liquid crystal panel 20. The vertical axis in FIG. 26 plots the transmittance standardized by the transmittance, given as 100, of the switch liquid crystal panel of the stereoscopic display device according to the comparative example.

As is clear from FIG. 26, when the intersection angle is 18°, if the retardation is 380 nm or more, the decrease of the transmittance as compared with that of the comparative example can be controlled within 10%.

Figures 27, 28:
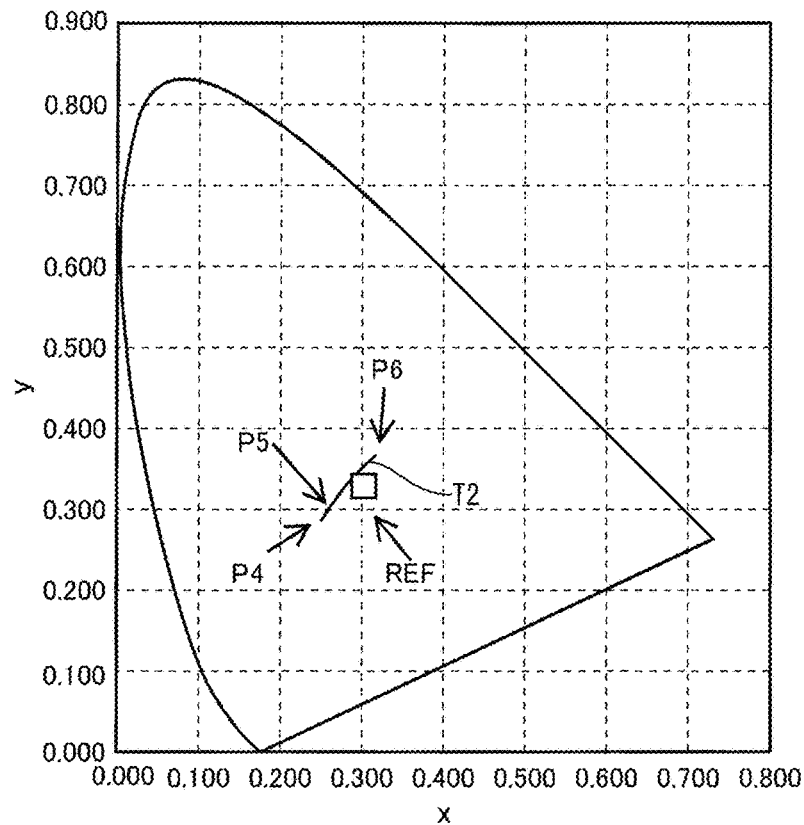
FIG. 27 illustrates the relationship between retardation of a liquid crystal layer and chromaticity shifts due to the switch liquid crystal panel, on an xy chromaticity diagram.
FIG. 28 is a table in which transmittance reduction ratios and chromaticity shifts ($\Delta x$, $\Delta y$) when the retardation of the liquid crystal layer is varied are compiled.

FIG. 27 illustrates the relationship between the retardation of the liquid crystal layer 23 and chromaticity shift due to the switch liquid crystal panel 20, on the xy chromaticity diagram. The curve T2 in FIG. 27 indicates a locus of changes of the chromaticity viewed from the right front when retardation of the stereoscopic display device of the configuration example was varied. The mark denoted by the reference symbol REF in FIG. 27 indicates chromaticity when the stereoscopic display device according to the comparative example was viewed from the right front. The point P4 on the curve T2 indicates chromaticity when the retardation was 237 nm. Similarly, the point P5 indicates chromaticity when the retardation was 351 nm, and the point P6 indicates chromaticity when the retardation was 514 nm.

FIG. 28 is a table in which transmittance decrease ratios and chromaticity shifts (Δx, Δy) when the retardation of the liquid crystal layer was varied are compiled. As mentioned above, in the case where the intersection angle was 18°, when the retardation was 380 nm or more, the decrease in luminance was controlled within 10%. Besides, in a case where the intersection angle was 18°, when the retardation was 466 nm or less, the chromaticity shift Δy was controlled to 0.035 or less.

Figure 29A:
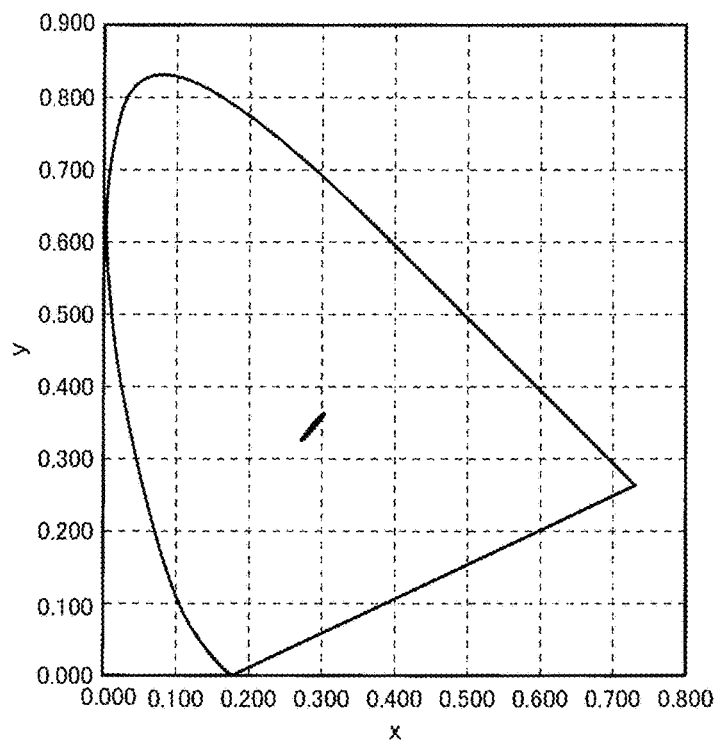
FIG. 29A illustrates, on an xy chromaticity diagram, a chromaticity range when a stereoscopic display device according to a configuration example 2-1 is viewed from a variety of angles.
Figure 29B:
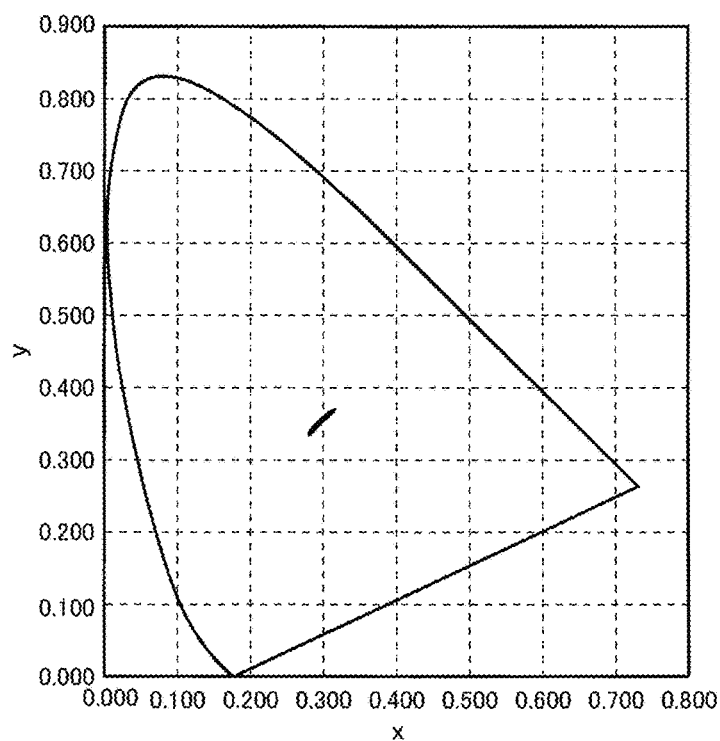
FIG. 29B illustrates, on an xy chromaticity diagram, a chromaticity range when a stereoscopic display device according to a configuration example 2-2 is viewed from a variety of angles.

FIG. 29A illustrates, on an xy chromaticity diagram, a chromaticity range when the stereoscopic display device according to the configuration example 2-1 was viewed from a variety of angles. Similarly, FIG. 29B illustrates a chromaticity range of a stereoscopic display device according to the configuration example 2-2.

The chromaticity range of the stereoscopic display device according to the configuration example 2-1 had an x-direction width of 0.0309 (from 0.2731 to 0.3040), and a y-direction width of 0.0358 (from 0.3235 to 0.3598). The chromaticity range of the stereoscopic display device according to the configuration example 2-2 had an x-direction width of 0.0359 (from 0.2810 to 0.3168), and a y-direction width of 0.0365 (from 0.3337 to 0.3702). The widths of chromaticity shifts of the stereoscopic display device according to the configuration examples 2-1 and 2-2 were also at an acceptable level.

Figure 30A:
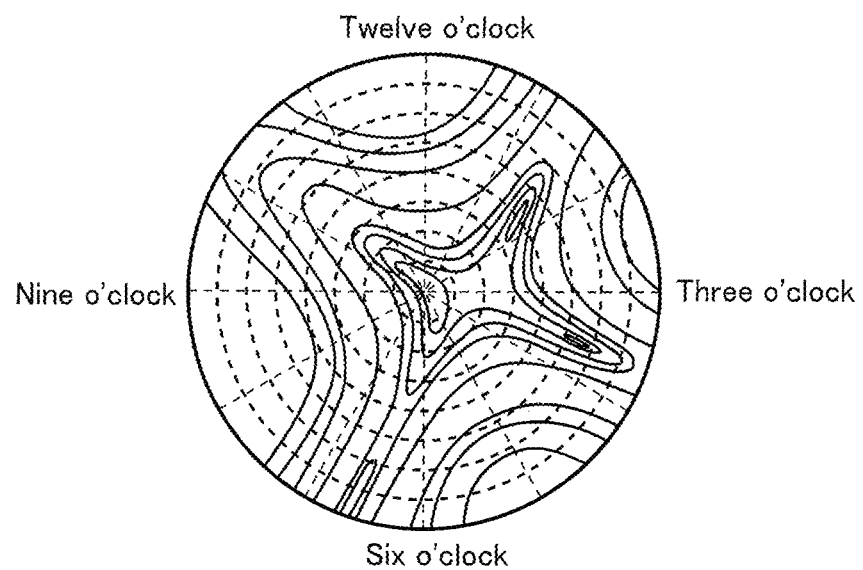
FIG. 30A illustrates contrast properties of a switch liquid crystal panel of the stereoscopic display device according to the configuration example 2-1.
Figure 30B:
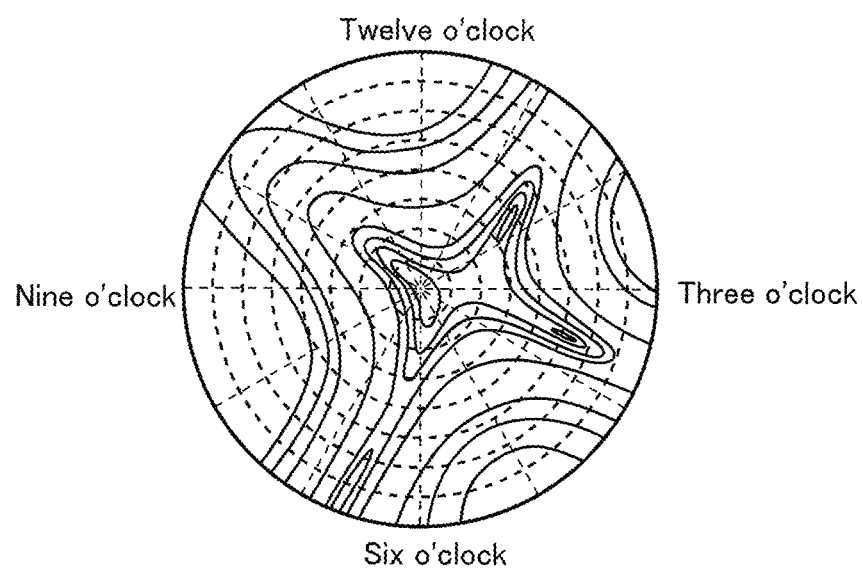
FIG. 30B illustrates contrast properties of a switch liquid crystal panel of the stereoscopic display device according to the configuration example 2-2.

FIG. 30A illustrates contrast properties of the switch liquid crystal panel 20 of the stereoscopic display device according to the configuration example 2-1. Similarly, FIG. 30B illustrates contrast properties of the switch liquid crystal panel 20 of the stereoscopic display device according to the configuration example 2-2.

In the stereoscopic display devices according to the configuration examples 2-1 and 2-2 as well, horizontally symmetric contrast properties were obtained by setting the viewing angle direction to the six-o'clock direction (the vertical direction).

Figure 31A:
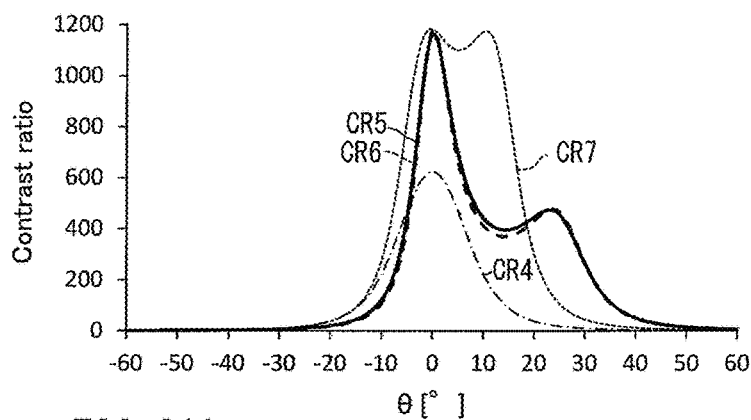
FIG. 31A is a graph illustrating contrast properties of the stereoscopic display devices along the three-o'clock to nine-o'clock direction.
Figure 31B:
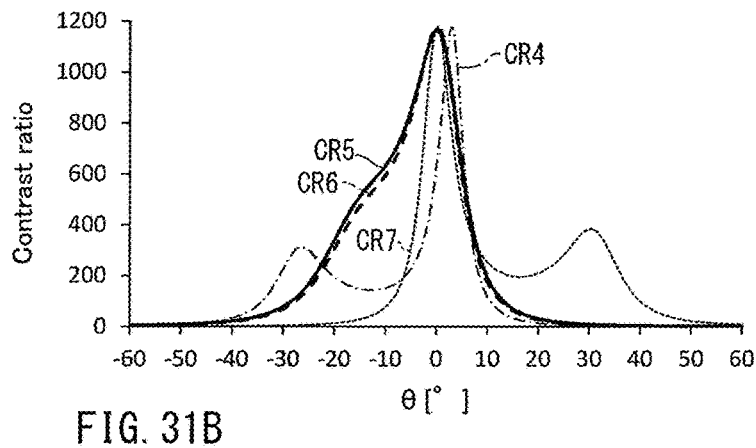
FIG. 31B is a graph illustrating contrast properties of the stereoscopic display devices along the six-o'clock to twelve-o'clock direction.

FIG. 31A is a graph illustrating contrast properties of the stereoscopic display devices along the three-o'clock to nine-o'clock direction. FIG. 31B is a graph illustrating contrast properties of the stereoscopic display devices along the six-o'clock to twelve-o'clock direction. In FIGS. 31A and 31B, the curve CR5 indicates contrast properties of the stereoscopic display device according to the configuration example 2-1, and the curve CR6 indicates contrast properties of the stereoscopic display device according to the configuration example 1-2. The curve CR7 indicates contrast properties of the stereoscopic display device according to the comparative example, and the curve CR4 indicates contrast properties in the case of FIG. 18D.

In the stereoscopic display devices according to the configuration examples 2-1 and 2-2 as well, an area with high contrast extends not only in the right front direction, but also in the three-o'clock to six-o'clock direction. Further, as compared with the comparative example, a high contrast was obtained as a whole.

It should be noted that, in the configuration examples 2-1 and 2-2 as well, as is the case with the configuration example 1-1, the response time of the switch liquid crystal panel 20 can be reduced. Besides, the difference in the response time between the case of movement from right to left and the case of movement from right to left can be decreased.

As is clear from the above-described evaluation results, in a case where the intersection angle is 18°, decrease of luminance and chromaticity shift can be suppressed by setting retardation to 380 to 466 nm.

As described above, as the intersection angle is smaller, decrease of luminance and chromaticity shift can be reduced further. Therefore, by setting retardation to 380 nm to 466 nm, an effect equal to or higher than the level of the above-described configuration example can be achieved, at any intersection angle equal to 18° or smaller.

In the foregoing description, the case where the intersection angle was 18° and the case where the intersection angle was 45° are considered, but the intersection angle may be an arbitrary angle in a range of 0° exclusive to 45° inclusive. Besides, the display panel may be other than an IPS panel or a VA panel; the display panel may be another type of a liquid crystal display panel such as an ECB panel. For example, the display panel 10 may be a single-domain IPS panel, and the intersection angle may be 38°. Alternatively, the display panel 10 may be an ECB panel, and the intersection angle may be 30°.

Taking the configuration example 1 and the configuration example 2 into consideration together, in a case where the intersection angle is in a range of 0° exclusive to 18° exclusive, the retardation may be set in a range of 380 nm to 466 nm, and in a case where the intersection angle is in a range of 18° exclusive to 45° exclusive, the retardation may be set in a range of 410 nm to 450 nm.

Embodiment 2

Figure 32:
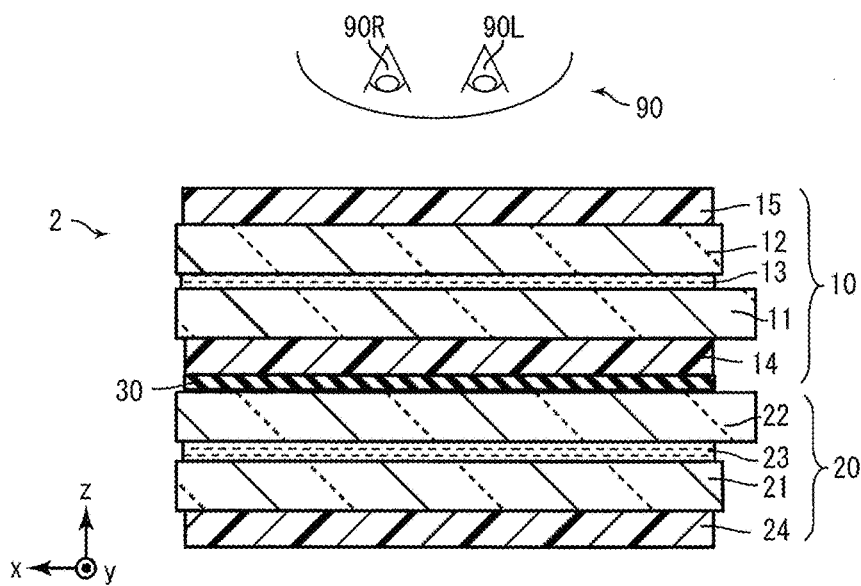
FIG. 32 is a schematic cross-sectional view illustrating a configuration of a stereoscopic display device according to Embodiment 2 of the present invention.

FIG. 32 is a schematic cross-sectional view illustrating a configuration of a stereoscopic display device according to Embodiment 2 of the present invention. The stereoscopic display device 2 is different from the stereoscopic display device 1 in the point that the display panel 10 is arranged on the viewer 90 side.

In other words, in the present embodiment, light separated by the switch liquid crystal panel 20 passes through the display panel 10. In this configuration, light separated by the switch liquid crystal panel 20 is scattered or diffracted by the display panel 10. This causes the angle-dependent variation of the luminance to become gradual.

In the present embodiment, an angle formed between the rubbing direction of the alignment film of the second substrate 22 and the transmission axis of the polarizing plate 14 is an intersection angle.

In the present embodiment as well, the alignment film of the first substrate 21 and the alignment film of the second substrate are rubbed so that the viewing angle direction is parallel to the vertical direction. Besides, the retardation of the liquid crystal layer 23 is set to 380 nm to 466 nm when the intersection angle is in a range of 0° exclusive to 18° inclusive, and the retardation is set to 410 nm to 450 nm when the intersection angle is in a range of 18° exclusive to 45° inclusive.

By the present embodiment, the same effects as those in Embodiment 1 can be achieved.

It should be noted that the polarizing plate 14 may be arranged on the switch liquid crystal panel 20. In other words, the polarizing plate 14 may be arranged on a surface of the display panel 10 on the side of the second substrate 22 of the switch liquid crystal panel 20, and the adhesive resin 30 may be arranged between the polarizing plate 14 and the TFT substrate 11.

Other Embodiments

The foregoing description describes embodiments of the present invention, but the present invention is not limited to the embodiments described above, and may be varied in many ways within the scope of the invention. Further, the embodiments can be carried out in combination appropriately.

In the foregoing description of the embodiments, the case where electrodes of twelve systems in total are formed on the first and second substrates 21 and 22 of the switch liquid crystal panel 20 is described as an example. The number of electrodes formed on the switch liquid crystal panel 20, however, is arbitrary.

In the foregoing description of the embodiments, the case where pattern electrodes are formed on both of the first and second substrates 21 and 22 of the switch liquid crystal panel 20, and the electrodes formed on the first electrode 21 and the electrodes formed on the second substrate 22 are arranged with a deviation of half of the pitch, is described. This configuration is merely an example, and the switch liquid crystal panel 20 may have an arbitrary configuration. For example, the configuration of the switch liquid crystal panel 20 may be as follows: pattern electrodes are formed on the first substrate 21, and a common electrode is formed over a substantially entire surface of the second substrate 22.

INDUSTRIAL APPLICABILITY

The present invention is industrially applicable as a stereoscopic display device.

The invention claimed is:
1. A stereoscopic display device comprising:
a display panel that displays an image;
a switch liquid crystal panel arranged on the display panel;
a first polarizing plate and a second polarizing plate arranged so as to be opposed to each other with the switch liquid crystal panel being interposed therebetween;
a position sensor for acquiring position information of a viewer; and
a control unit that moves a parallax barrier in which transmitting regions and non-transmitting regions are defined in periodic fashion in a predetermined alignment direction, in such a manner that the parallax barrier is moved in the predetermined alignment direction in accordance with the position information, and causes the switch liquid crystal panel to display the parallax barrier, wherein
the switch liquid crystal panel includes:
a liquid crystal layer;
a first substrate and a second substrate that are opposed to each other with the liquid crystal layer being interposed therebetween;
a first alignment film defined on the first substrate; and
a second alignment film defined on the second substrate,
the first alignment film and the second alignment film are rubbed so that molecule long axes of liquid crystal molecules in vicinities of a center of the liquid crystal layer in the thickness direction in a state where no voltage is applied are oriented in a direction perpendicular to the alignment direction as viewed in a plan view,
an intersection angle is in a range of 0° exclusive to 45° inclusive, the intersection angle being an angle defined between a rubbing direction of the alignment film on a display panel side among the first alignment film and the second alignment film, and a transmission axis of the polarizing plate on the display panel side among the first polarizing plate and the second polarizing plate, and
retardation of the liquid crystal layer is in a range of 380 nm to 466 nm both inclusive when the intersection angle is in a range of 0° exclusive to 18° inclusive, and is in a range of 410 nm to 450 nm both inclusive when the intersection angle is in a range of 18° exclusive to 45° inclusive.
2. The stereoscopic display device according to claim 1, wherein
an angle defined between a transmission axis of the first polarizing plate and a transmission axis of the second polarizing plate is 90°, and an angle defined between a rubbing direction of the first alignment film and a rubbing direction of the second alignment film is 90°.

3. The stereoscopic display device according to claim 1, wherein the intersection angle is 45°.

4. The stereoscopic display device according to claim 1, wherein the intersection angle is 18°.

5. The stereoscopic display device according to claim 1, wherein the switch liquid crystal panel is arranged on the viewer side with respect to the display panel.

6. The stereoscopic display device according to claim 1, wherein the switch liquid crystal panel further includes:
   a first electrode group that includes a plurality of electrodes that are arranged in the alignment direction at a predetermined interval on the first substrate; and
   a second electrode group that includes a plurality of electrodes that are arranged in the alignment direction at a predetermined interval on the second substrate,
   wherein the first electrode group and the second electrode group are arranged so as to be deviated with respect to each other by half of the predetermined interval in the alignment direction.

7. The stereoscopic display device according to claim 1, wherein the display panel is an in-plane switching (IPS) liquid crystal display panel.

8. The stereoscopic display device according to claim 1, wherein the display panel is a vertical alignment (VA) liquid crystal display panel.

* * * * *